(12) United States Patent
Jung et al.

(10) Patent No.: US 11,024,947 B2
(45) Date of Patent: Jun. 1, 2021

(54) MOBILE TERMINAL

(71) Applicant: LG ELECTRONICS INC., Seoul (KR)

(72) Inventors: Byungwoon Jung, Seoul (KR); Dongjin Kim, Seoul (KR); Yeomin Youn, Seoul (KR); Jihun Ha, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/894,721

(22) Filed: Jun. 5, 2020

(65) Prior Publication Data

US 2020/0303809 A1 Sep. 24, 2020

Related U.S. Application Data

(63) Continuation of application No. 15/952,159, filed on Apr. 12, 2018, now Pat. No. 10,700,416.

(30) Foreign Application Priority Data

Sep. 27, 2017 (KR) .................. 10-2017-0125378

(51) Int. Cl.
*H01Q 1/24* (2006.01)
*H01Q 13/10* (2006.01)
(Continued)

(52) U.S. Cl.
CPC ............ *H01Q 1/243* (2013.01); *H01Q 1/521* (2013.01); *H01Q 13/10* (2013.01); *H01Q 21/28* (2013.01);
(Continued)

(58) Field of Classification Search
None
See application file for complete search history.

(56) References Cited

U.S. PATENT DOCUMENTS 7,079,079 B2    7/2006  Jo et al.
9,728,854 B2 *  8/2017  Kim .................... H01Q 7/00
(Continued)

FOREIGN PATENT DOCUMENTS

CN    106450662    2/2017
CN    107026326    8/2017
(Continued)

OTHER PUBLICATIONS

United States Patent and Trademark Office Application U.S. Appl. No. 15/952,159, Office Action dated Oct. 30, 2019, 30 pages.
(Continued)

*Primary Examiner* — Ab Salam Alkassim, Jr.
(74) *Attorney, Agent, or Firm* — Lee, Hong, Degerman, Kang & Waimey

(57) ABSTRACT

A mobile terminal is provided that includes a metal frame including a base unit and a side unit, a main substrate located on a rear surface of the base unit, a display unit seated on a front surface of the base unit, and feed lines extending from the main substrate, connected to the side unit and supplying power to the side unit. The side unit includes a first conductive member including a first part and a second part, a second conductive member including a third part and a fourth part, a third conductive member located between the first and second conductive members, a first slit provided between the first and third conductive members and a second slit provided between the second and third conductive, and a length of the second part is two or more times a length of the first part.

20 Claims, 20 Drawing Sheets

Related U.S. Application Data

(60) Provisional application No. 62/552,353, filed on Aug. 30, 2017.

(51) Int. Cl.
*H01Q 1/52* (2006.01)
*H01Q 21/28* (2006.01)
*H01Q 5/328* (2015.01)
*H01Q 5/371* (2015.01)
*H01Q 5/35* (2015.01)

(52) U.S. Cl.
CPC ............... *H01Q 5/328* (2015.01); *H01Q 5/35* (2015.01); *H01Q 5/371* (2015.01)

(56) References Cited

U.S. PATENT DOCUMENTS

| | | | | |
|---|---|---|---|---|
| 9,762,710 | B2* | 9/2017 | Lee | H01Q 1/48 |
| 9,894,781 | B2 | 2/2018 | Franklin et al. | |
| 10,224,612 | B1 | 3/2019 | Wang et al. | |
| 10,283,858 | B2* | 5/2019 | Xue | H01Q 1/243 |
| 10,305,170 | B2 | 5/2019 | Kwak | |
| 10,312,571 | B2 | 6/2019 | Edwards et al. | |
| 10,340,592 | B2 | 7/2019 | Nam et al. | |
| 10,396,837 | B2 | 8/2019 | Shin et al. | |
| 10,522,901 | B2 | 12/2019 | Xiong et al. | |
| 10,741,904 | B2* | 8/2020 | Kim | H04W 84/12 |
| 10,886,614 | B2* | 1/2021 | Lee | H01Q 13/10 |
| 10,887,434 | B2* | 1/2021 | Hwang | H04M 1/0202 |
| 2012/0112970 | A1 | 5/2012 | Caballero et al. | |
| 2012/0218723 | A1 | 8/2012 | Kwak et al. | |
| 2012/0229347 | A1 | 9/2012 | Jin et al. | |
| 2012/0262345 | A1 | 10/2012 | Kim et al. | |
| 2013/0135157 | A1 | 5/2013 | Tsou et al. | |
| 2013/0328051 | A1 | 12/2013 | Franklin et al. | |
| 2014/0078008 | A1 | 3/2014 | Kang et al. | |
| 2014/0266922 | A1* | 9/2014 | Jin | H01Q 5/314 |
| | | | | 343/702 |
| 2015/0145734 | A1 | 5/2015 | Caballero et al. | |
| 2015/0188212 | A1 | 7/2015 | Tseng et al. | |
| 2015/0318601 | A1 | 11/2015 | Lin | |
| 2016/0049720 | A1 | 2/2016 | Hwang et al. | |
| 2016/0064820 | A1 | 3/2016 | Kim et al. | |
| 2016/0118710 | A1* | 4/2016 | Shin | H01Q 9/42 |
| | | | | 343/702 |
| 2016/0164167 | A1 | 6/2016 | Choi et al. | |
| 2016/0226132 | A1 | 8/2016 | Kim et al. | |
| 2016/0308271 | A1* | 10/2016 | Jin | H04B 1/3888 |
| 2017/0012347 | A1 | 1/2017 | Ofiguchi et al. | |
| 2017/0048363 | A1 | 2/2017 | Lee et al. | |
| 2017/0141820 | A1* | 5/2017 | Kim | H01Q 1/42 |
| 2017/0170562 | A1 | 7/2017 | Lee et al. | |
| 2017/0201010 | A1 | 7/2017 | Kim et al. | |
| 2017/0207515 | A1 | 7/2017 | Li et al. | |
| 2017/0230073 | A1 | 8/2017 | Youn et al. | |
| 2017/0294709 | A1 | 10/2017 | Xue et al. | |
| 2017/0302771 | A1 | 10/2017 | Kim et al. | |
| 2017/0346159 | A1 | 11/2017 | Xue et al. | |
| 2018/0026333 | A1* | 1/2018 | Lee | H01Q 13/18 |
| | | | | 343/702 |
| 2018/0026334 | A1 | 1/2018 | Chen et al. | |
| 2018/0026336 | A1 | 1/2018 | Chen et al. | |
| 2018/0034135 | A1 | 2/2018 | Kwak et al. | |
| 2018/0233807 | A1 | 8/2018 | Ma et al. | |
| 2018/0261907 | A1 | 9/2018 | Ha et al. | |
| 2018/0261921 | A1 | 9/2018 | Ha et al. | |
| 2019/0036210 | A1 | 1/2019 | Kim et al. | |
| 2019/0067797 | A1* | 2/2019 | Jung | H01Q 1/243 |
| 2019/0115653 | A1 | 4/2019 | Yun et al. | |
| 2019/0181552 | A1* | 6/2019 | Lee | H01Q 13/10 |
| 2019/0181553 | A1* | 6/2019 | Lee | H01Q 9/42 |
| 2019/0181555 | A1* | 6/2019 | Lee | H01Q 9/30 |
| 2019/0181564 | A1 | 6/2019 | Kwon et al. | |
| 2019/0214714 | A1 | 7/2019 | Chen et al. | |
| 2019/0252764 | A1* | 8/2019 | Liao | H01Q 5/328 |
| 2019/0252765 | A1 | 8/2019 | Chen et al. | |
| 2019/0260112 | A1 | 8/2019 | Azad et al. | |
| 2019/0348750 | A1 | 11/2019 | Lin | |
| 2020/0007184 | A1 | 1/2020 | Jung et al. | |
| 2020/0052401 | A1* | 2/2020 | Chang | H01Q 5/35 |
| 2020/0058993 | A1* | 2/2020 | Qiu | H01Q 5/35 |
| 2020/0076056 | A1* | 3/2020 | Froese | H01Q 1/42 |
| 2020/0076059 | A1* | 3/2020 | Hsiao | H01Q 9/42 |
| 2020/0106160 | A1* | 4/2020 | Chen | H01Q 13/10 |
| 2020/0162591 | A1* | 5/2020 | Jung | H01Q 1/24 |

FOREIGN PATENT DOCUMENTS

| | | |
|---|---|---|
| JP | 2017135670 | 8/2017 |
| KR | 1020160023438 | 3/2016 |
| KR | 1020160027700 | 3/2016 |
| KR | 1020160094791 | 8/2016 |
| KR | 1020170062283 | 6/2017 |
| KR | 1020170098140 | 8/2017 |

OTHER PUBLICATIONS

Korean Intellectual Property Office Application No. 10-2017-0125378, Office Action dated Aug. 14, 2018, 6 pages.
European Patent Office Application Serial No. 18177216.1, Search Report dated Nov. 22, 2018, 12 pages.
The State Intellectual Property Office of the People's Republic of China Application Serial No. 201810581057.3, Office Action dated Dec. 11, 2020, 18 pages.
Korean Intellectual Property Office Application Serial No. 10-2019-0032403, Notice of Allowance dated Jan. 18, 2021, 7 pages.

* cited by examiner (b)

[Right Hand Grip]

[Left Hand Grip]

MOBILE TERMINAL

CROSS-REFERENCE TO RELATED APPLICATIONS

This application is a continuation of U.S. patent application Ser. No. 15/952,159, filed on Apr. 12, 2018, now U.S. Pat. No. 10,700,416, which claims the benefit of earlier filing date and right of priority to Korean Patent Application No. 10-2017-0125378, filed on Sep. 27, 2017, and also claims the benefit of U.S. Provisional Application No. 62/552,353, filed on Aug. 30, 2017, the contents of which are all hereby incorporated by reference herein in their entirety.

BACKGROUND OF THE INVENTION

Field of the Invention

The present invention relates to a mobile terminal having antennas arranged on side surfaces thereof so as to secure antenna performance while reducing the size of a bezel.

Discussion of the Related Art

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

As such functions become more diversified, the mobile terminal can support more complicated functions such as capturing images or video, reproducing music or video files, playing games, receiving broadcast signals, and the like. By comprehensively and collectively implementing such functions, the mobile terminal may be embodied in the form of a multimedia player or device.

As such functions of mobile terminals are extended, mobile terminals exchange data using various wireless communication methods. A mobile terminal may, in order to use various wireless communication methods, have antennas having different frequency characteristics and, in order to transmit and receive a large amount of data, have a plurality of antennas operated in one frequency band, thus being capable of simultaneously or sequentially transmitting and receiving data.

However, wireless communication is influenced by peripheral electronic parts and causes mutual interference and, thus, research on distances of the mobile terminal from other parts and a distance between antennas and arrangement of the antennas is carried out. Particularly, as the size of a display unit of the mobile terminal is increased, the size of a bezel is decreased and a distance between a side case used as antennas and a flexible display substrate influences wireless communication performance of the mobile terminal, and, thus, there are needs for an antenna design which may reduce influence from a flexible display substrate.

SUMMARY OF THE INVENTION

Accordingly, the present invention is directed to a mobile terminal that substantially obviates one or more problems due to limitations and disadvantages of the related art.

An object of the present invention is to provide a mobile terminal having antennas arranged on side surfaces thereof so as to secure antenna performance while reducing the size of a bezel.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal includes a metal frame including a base unit and a side unit, at least a part thereof being spaced apart from the base unit, the side unit forming an external appearance of side surfaces of the mobile terminal, a main substrate located on a rear surface of the base unit, a display unit seated on a front surface of the base unit, and feed lines extending from the main substrate, connected to the side unit and supplying power to the side unit, wherein the side unit includes a first conductive member including a first part located on a first side surface of the mobile terminal and a second part located on a second side surface adjacent to the first side surface, a second conductive member including a third part located on the first side surface and a fourth part located on a third side surface facing the second side surface, a third conductive member located between the first conductive member and the second conductive member on the first side surface, a first slit provided between the third conductive member and the first conductive member, and a second slit provided between the third conductive member and the second conductive member, wherein the first conductive member and the base unit form a slot to form a first antenna transmitting and receiving a first signal, the second conductive member and the base unit form another slot to form a second antenna transmitting and receiving a second signal, and a length of the second part of the first conductive member is two or more times a length of the first part.

The second part of the first conductive member and the fourth part of the second conductive member may be connected to the base unit.

The side unit may further include a fourth conductive member located on the second side surface and connected to the base unit and a third slit provided between the first conductive member and the fourth conductive member.

The mobile terminal may further include a ground line arranged adjacent to the third slit and grounding the first conductive member, and the sum of a length of the ground line and a length of the first conductive member may correspond to ¼ ($\Delta_1/4$) of a wavelength of the first signal.

The mobile terminal may further include a switch located on the ground line.

A length from a portion of the fourth conductive member connected to the base unit to the third slit may be ¼ ($\Delta_3/4$)

or less of a wavelength of a third signal transmitted and received by the fourth conductive member.

The mobile terminal may further include a changeover switch configured to supply power selectively to the first conductive member and the second conductive member, and a controller configured to control the changeover switch so as to supply power selectively to the first conductive member and the second conductive member.

The mobile terminal may further include a fourth conductive member located on the second side surface and connected to the base unit, a third slit provided between the first conductive member and the fourth conductive member, a first feed unit configured to supply power to the first conductive member and the fourth conductive member and connected to the changeover switch, a first switch arranged adjacent to the third slit and connected to the first conductive member, a second feed unit configured to supply power to the second conductive member and connected to the changeover switch, and a second switch connected to an intermediate part of the second conductive member, the second conductive member may have a length corresponding to a length of the first conductive member, and the controller may, if performance of the first antenna is in a normal state, control the changeover switch so that the first antenna transmits and receives a signal of a low frequency and close the second switch so as to short-circuit the second switch and, if performance of the first antenna is degraded, control the changeover switch so that the second antenna transmits and receives the signal of the low frequency and close the first switch so as to short-circuit the first switch.

The mobile terminal may further include a flexible display substrate extending from the end of the display unit, passes through a space between the base unit and the third conductive member and is connected to the main substrate, and the first conductive member and the second conductive member may not overlap the flexible display substrate.

The mobile terminal may further include a notch part depressed in a stair shape from an upper portion of the display unit and electronic parts arranged between the notch part and the second conductive member, the second conductive member may not overlap the electronic parts, and the electronic parts may include at least one of a camera, a receiver or a sensor.

The mobile terminal may further include a touch sensor arranged so as to overlap the display unit and a flexible touch sensor substrate configured to transmit a signal sensed by the touch sensor to the main substrate, and the second conductive member may not overlap the flexible touch sensor substrate.

The mobile terminal may further include a battery arranged on the rear surface of the base unit adjacent to the third side surface and a radio frequency IC (RFIC) mounted on the main substrate and controlling power supplied to the conductive members, the main substrate may be located adjacent to the second side surface, and the feed lines may include a first feed line connected from the RFIC to the second part of the first conductive member located on the second side surface.

The mobile terminal may further include a first switch connected to the first conductive member and adjusting a wavelength of the first signal, and the first switch may be arranged so as to be spaced apart from the first feed line at a designated distance.

Lengths of the first part and the third part may be 12 mm or more, and the length of the second part may be 50 mm or less.

Lengths of the third part and the fourth part of the second conductive member may be similar to each other.

A distance of a space between the second part and the base unit may be 1 mm to 3 mm.

A length of the first conductive member may correspond to ¼ ($\lambda_1/4$) or less of a wavelength of the first signal.

The mobile terminal may further include a stub connected to the first part of the first conductive member, and the sum of the length of the first conductive member and a length of the stub may correspond to ¼ ($\lambda_1/4$) of the wavelength of the first signal.

The slits may be filled with an insulating material.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1A:
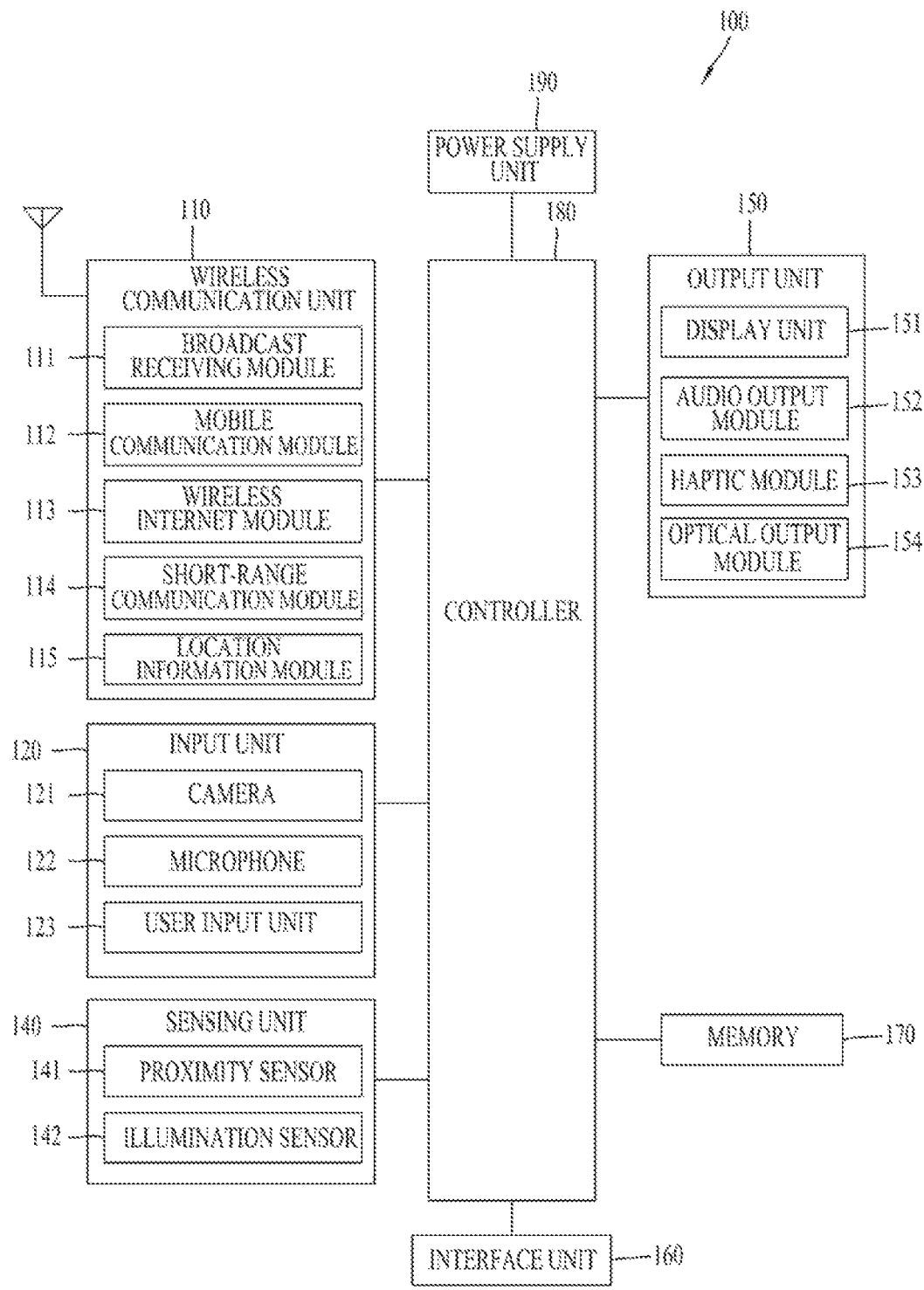
FIG. 1A is a block diagram of a mobile terminal in accordance with the present disclosure.

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be directly connected with the other element or intervening elements may also be present. In contrast, when an element is referred to as being "directly connected with" another element, there are no intervening elements present.

The terminology used in the present disclosure is used only to describe specific embodiments, not intended to limit the present disclosure. A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

In general, a suffix such as "module" and "unit" may be used to refer to elements or components. Use of such a suffix herein is merely intended to facilitate description of the specification, and the suffix itself is not intended to give any special meaning or function.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1B:
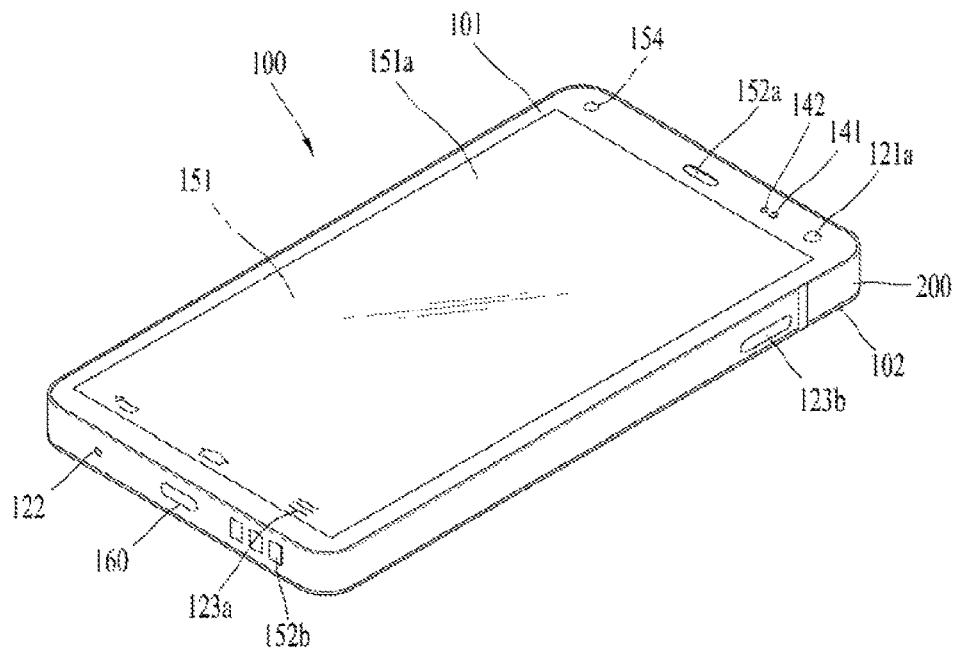
FIGS. 1B and 1C are conceptual views of one example of the mobile terminal, viewed from different directions.
Figure 1C:
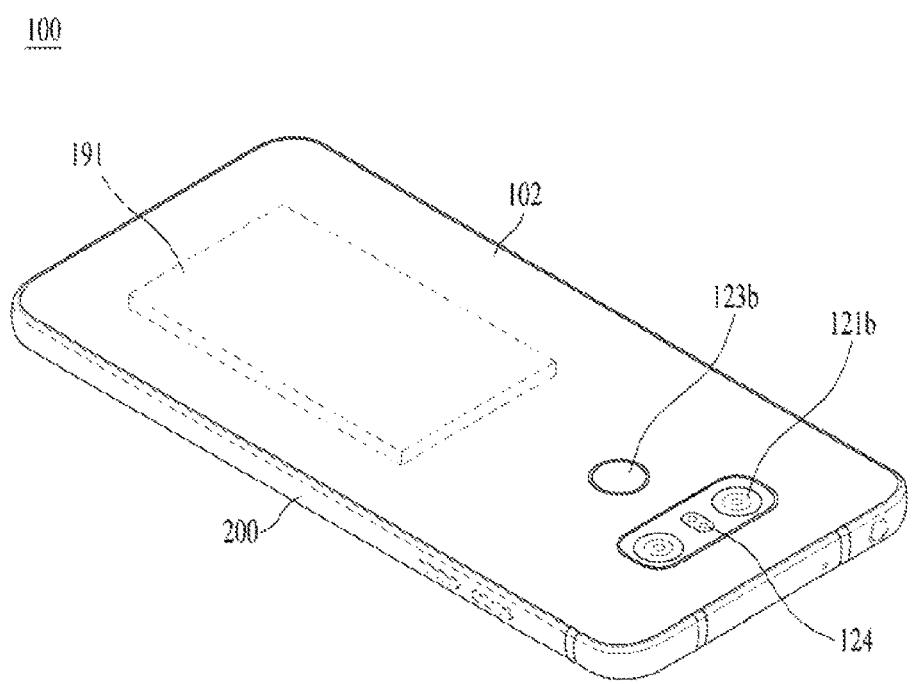

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components in the FIG. 1A is not a requirement, and that greater or fewer components may alternatively be implemented.

More specifically, the wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, the sensing unit 140 may alternatively or additionally include other types of sensors or devices, such as a proximity sensor 141 and an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output, or activating application programs stored in the memory 170.

To drive the application programs stored in the memory 170, the controller 180 may be implemented to control a predetermined number of the components mentioned above in reference with FIG. 1A. Moreover, the controller 180 may be implemented to combinedly operate two or more of the components provided in the mobile terminal 100 to drive the application programs.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Some or more of the components may be operated cooperatively to embody an operation, control or a control method of the mobile terminal in accordance with embodiments of the present disclosure. Also, the operation, control or control method of the mobile terminal may be realized on the mobile terminal by driving of one or more application problems stored in the memory 170.

Hereinafter, referring to FIG. 1, the components mentioned above will be described in detail before describing the various embodiments which are realized by the mobile terminal 100 in accordance with the present disclosure.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (λP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 may be provided with the power supplied by an external power source and the power supplied therein under the control of the controller 180 so as to supply the needed power to each of the components. The power supply unit 190 may include a battery. The battery may be a built-in type which is rechargeable and detachably loaded in the terminal to be charged.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

Here, the terminal body may be understood to refer to the concept of this bore a mobile terminal (100) to at least one of the aggregate.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151*a* of the display unit 151 may be mounted to the front case 101 to form the front surface of the terminal body together with the front case 101.

The mobile terminal 100 may include a metal frame including a base unit 107 (with reference to FIG. 3) supporting the rear surface of the display unit 151 so as to maintain rigidity of the mobile terminal 100, and the metal frame may include a metal material for rigidity of the mobile terminal 100. Further, the metal frame may not only provide rigidity to the mobile terminal 100 but also is formed of a conductive material having a large area and thus serve as a ground, thereby being connected to electronic parts, such as antennas, so as to ground the respective parts.

The base unit 107 may be configured in a shape which is not exposed to the outside, and be connected to the front case 101 located on the front surface of the terminal body or a side unit 200 located on the side surface of the terminal body so as to form an integral metal case.

As multimedia functions of mobile terminals are extended, the size of the display unit 151 is increased and the size of a bezel located around the display unit 151 is gradually decreased. Particularly, an upper end portion of the bezel requires security of a space in which the camera 121, the audio output module 152, the proximity sensor 141, etc. are located, and a lower end portion of the bezel in which physical buttons are arranged limits extension of the size of the display unit 151.

However, recently, sizes of the respective parts are minimized, and the user input unit 123 using soft keys instead of the physical buttons is implemented and, thus, the soft keys are output through the screen only if necessary and disappear if not necessary and the size of the screen may be further increased.

In some embodiments, electronic components may also be mounted to the rear case 102. Examples of such electronic components include a detachable battery 191, an identification module, a memory card, and the like. Rear cover is shown covering the electronic components, and this cover may be detachably coupled to the rear case 102. Therefore, when the rear cover is detached from the rear case 102, the electronic components mounted to the rear case 102 are externally exposed.

As illustrated, when the rear cover is coupled to the rear case 102, a side surface of the rear case 102 is partially exposed. In some cases, upon the coupling, the rear case 102 may also be completely shielded by the rear cover. In some embodiments, the rear cover may include an opening for externally exposing a camera 121b or an audio output module 152b.

The cases 101, 102 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover, to hermetically seal an inner space when those cases are coupled.

The mobile terminal 100 may include the display unit 151, the audio output module, the proximity sensor 141, the illuminance sensor 142, the optical output module 154, the camera 121, the user input unit 123, the microphone 122 and the interface unit 160.

It will be described for the mobile terminal as shown in FIGS. 1B and 1C. The display unit 151, the first audio output module 151a, the proximity sensor 141, an illumination sensor 142, the optical output module 154, the first camera 121a and the first manipulation unit 123a are arranged in front surface of the terminal body, the second manipulation unit 123b, the microphone 122 and interface unit 160 are arranged in side surface of the terminal body, and the second audio output modules 151b and the second camera 121b are arranged in rear surface of the terminal body.

It is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

A flash 124 is shown located adjacent to the second camera 121b. When an image of a subject is captured with the camera 121b, the flash 124 may illuminate the subject.

The second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 (see FIG. 1A). may be retractable into the terminal body. Alternatively, an antenna may be formed using a film attached to an inner surface of the rear cover, or a case that includes a conductive material.

A power supply unit 190 for supplying power to the mobile terminal 100 may include a battery 191, which is mounted in the terminal body or detachably coupled to an outside of the terminal body.

The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover is shown coupled to the rear case 102 for shielding the battery 191, to prevent separation of the battery 191, and to protect the battery 191 from an external impact or from foreign material. When the battery 191 is detachable from the terminal body, the rear case may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Hereinafter, embodiments regarding a control method implemented by the above-configured mobile terminal will be described with reference to the accompanying drawings. It will be apparent to those skilled in the art that various modifications and variations can be made in the present invention without departing from the spirit or scope of the invention.

As multimedia functions are considered important, wireless communication executed by mobile terminals is performed in various manners, i.e., short-range wireless communication, long-distance wireless communication and machine-to-machine communication, and, here, frequency bands used are different and thus different conductive members are used.

Recently, as wireless communication technology is developed, large volumes of data are transmitted and received and, in order to support transmission and reception of large volumes of data, a multiple input multiple output (MIMO) scheme in which signals of the same frequency band are simultaneously or sequentially transmitted and received may be used. By increasing the number of base stations and the number of antennas of the mobile terminal 100 to two or more, data is transmitted through various paths and a receiving terminal detects signals received through the respective paths and, thus, interference is reduced and respective transmission speeds are lowered. In order to use the MIMO scheme, increase in the number of conductive members within a restricted size of a mobile terminal is required.

Since the conductive members form electromagnetic fields and thus mutually influence adjacent conductive materials, interference between the adjacent conductive members occurs and may thus cause performance degradation of wireless signals. Therefore, the conductive members may be attached to the case so as to be arranged at the outer portion of the mobile terminal, or the case may be used as the conductive member.

As the size of a display unit is increased, the size of left and right sides of a bezel of the mobile terminal is almost zero and, thus, parts of a side unit located at the left and right sides of the display unit 11 are substantially difficult to serve as antenna radiators and conductive members may be implemented at upper and lower portions of the mobile terminal.

Figure 2:
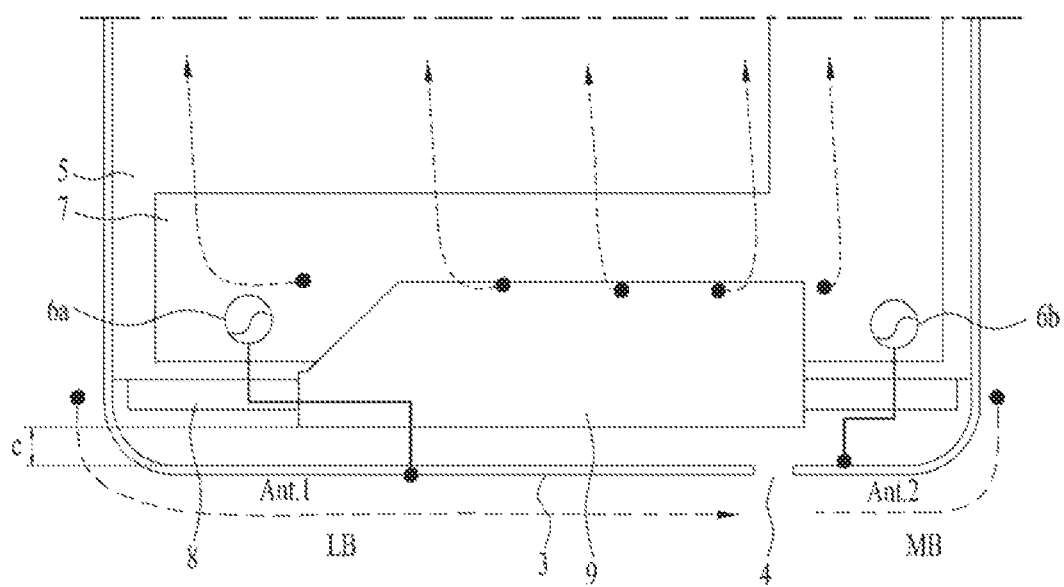
FIG. 2 is a view illustrating structures of antennas of a conventional mobile terminal.

FIG. 2 is a view illustrating structures of antennas of a conventional mobile terminal 100, viewed from a direction of the rear surface of the mobile terminal 100. A base unit 5 is seated on the rear surface of a display unit 8, and a main substrate 7 is seated thereon. An antenna is a device which transmits a signal through an electromagnetic field formed when power is applied to a conductive material. A side unit 3 of the mobile terminal 100 may include a metal material and, when power is supplied to the side unit 3 formed of the metal material through feed units 6a and 6b, the side unit 3 may be used as antennas.

The antenna may transmit and receive data while operating at a signal of a specific frequency band (resonant frequency). Since the resonant frequency is determined by the length of a radiator, the side unit 3 is divided by a slit 4 and, thus, conductive members having lengths corresponding to resonant frequencies may be implemented, as exemplarily shown in FIG. 2.

The conductive members are arranged so as to be spaced apart from the base unit 5 mounted in the mobile terminal 100. One side of the conductive member is connected to the base unit 5 and the other side of the conductive member is not connected to the base unit 5 and, thus, a slot-type antenna provided with one side which is closed and the other side which is open may be formed.

Recently, the display unit 8 serves both as an input unit and an output unit and, thus, in order to increase the area of the display unit 8, the size of a bezel located around the display unit 8 needs to be reduced. When the size of the bezel is reduced, a distance between the side unit 3 and the base unit 5 or the display unit 8 is decreased and, particularly, a distance between the side unit 3 and a flexible display substrate 9 influences antenna performance. The flexible display substrate 9 connects a drive IC to control each pixel of the display unit 8 to the main substrate 7, extends from the display unit 8, passes through a gap between the base unit 5 and side unit 3, and extends to the main substrate 7 located on the rear surface of the base unit 5.

The flexible display substrate 9 passes through the gap between the side unit 3 and the base unit 5 and, thus, for the purpose of antenna performance, a clearance c of the slot for antenna performance is determined by a distance between the flexible display substrate 9 and the side unit 3. In order to secure antenna performance, the clearance c of the slot may be 2 mm or more.

In order to prevent antenna performance degradation, the distance between the side unit 3 and the flexible display substrate 9 needs to be secured and such a distance may obstruct reduction in the size of the bezel at the lower end of the mobile terminal 100.

Further, in the antenna using the side unit 3, the greatest electromagnetic field is formed at the slit 4 and, thus, if the slit 4 is arranged adjacent to the base unit 5 or the flexible display substrate 9, wireless communication performance is degraded. In order to secure wireless communication performance, when the slit 4 is arranged so as to be spaced apart from the flexible display substrate 9, it is difficult to reduce the size of the bezel at the lower end of the mobile terminal 100.

Figure 3:
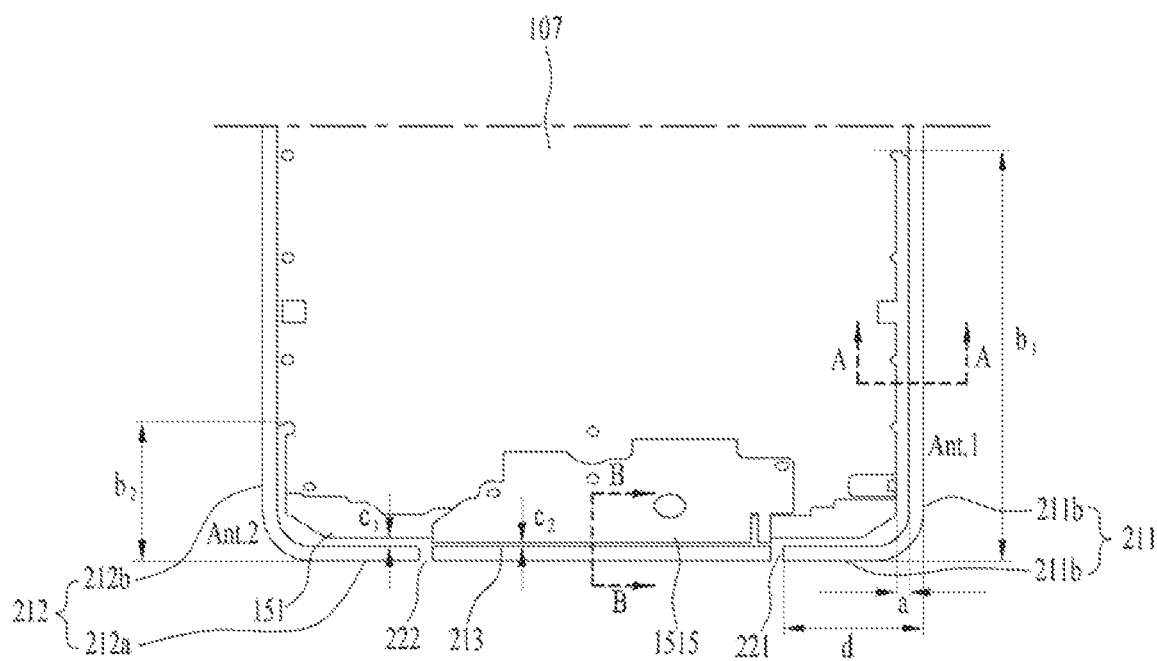
FIG. 3 is a view illustrating arrangement of a base unit, a side unit and a display unit of a mobile terminal in accordance with the present invention.

FIG. 3 is a view illustrating arrangement of a base unit 107, a side unit 200 and a display unit 151 of a mobile terminal 100 in accordance with the present invention. The mobile terminal 100 in accordance the present invention may reduce the size of a bezel while securing antenna performance and thus provide the display unit 151 having a large size. The mobile terminal 100 in accordance with the present invention may include the base unit 107, a main substrate 181, the side unit 200 and the display unit 151, and the side unit 200 may include a plurality of conductive members 211, 212 and 213, divided by slits 221 and 222.

The base unit 107 is formed of a rigid material, such as a metal, the front surface of the base unit 107 supports the rear surface of the display unit 151, and the rear surface of the base unit 107 provides a mounting part on which various parts are mounted. The base unit 107 not only provides rigidity to the mobile terminal 100 but also is formed of a conductive material having a large area and thus serves as a ground.

The display unit 151 is seated on the front surface of the base unit 107, the main substrate 181 is located on the rear surface of the base unit 107, and a drive IC 1513 (with reference to FIGS. 4A and 4B) of the display unit 151 and the main substrate 181 are connected by a flexible display substrate 1515. The flexible display substrate 1515 is bent at the end of the base unit 107 and connected to the main substrate 181.

The side unit 200 located around the base unit 107 is arranged such that a lower end (first side surface) thereof is spaced apart from the base unit 107 by a designated distance and portions of left and right parts (second and third side surfaces) located at the left and right sides of the mobile terminal 100 are connected to the base unit 107. In the side unit 200 in accordance with the present invention, the portions of the second and third side surfaces connected to the base unit 107 are spaced apart from the first side surface and, thus, a slot formed between the side unit 200 and the base unit 107 extends to the second side surface and the third side surface.

Two slits, i.e., the first slit 221 and the second slit 222, are formed on the first side surface of the side unit 200 and, thus, the side unit 200 may be divided into a first L-shaped conductive member 211 located on the first side surface and the second side surface, a second L-shaped conductive member 212 located on the first side surface and the third side surface, and a third conductive member 213 located between the first conductive member 211 and the second conductive member 212.

An antenna implemented by forming a slot between the first conductive member 211 located at the right in this figure and the base unit 107 is referred to as a first antenna Ant.1, and an antenna implemented by forming a slot between the second conductive member 212 located at the left and the base unit 107 is referred to as a second antenna Ant.2.

In this embodiment, the third conductive member 213 is not used as an antenna, and the first antenna Ant.1 and the second antenna Ant.2 are arranged so as to be distributed from the first side surface to the second and third side surfaces and, thus, influence of the flexible display substrate 1515 on the antennas Ant.1 and Ant.2 may be minimized. That is, a distance c2 between the flexible display substrate 1515 and the side unit 200 at the lower end of the mobile terminal 100 does not influence antenna performance and, thus, the size of the bezel may be reduced.

Figure 4A:
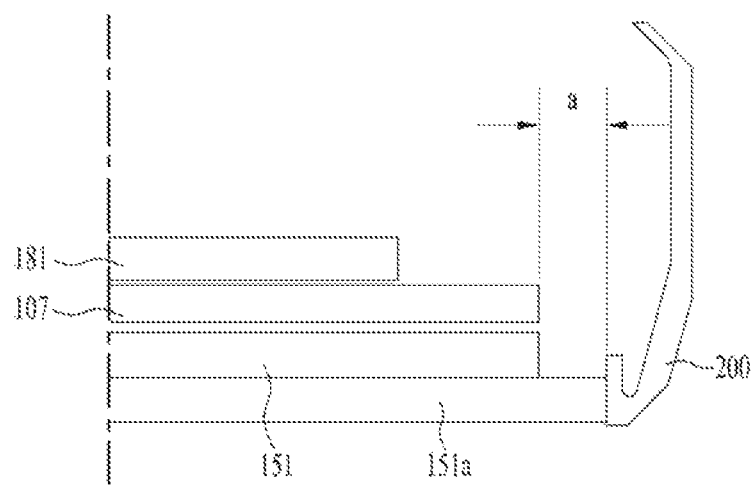
FIGS. 4A and 4B are cross-sectional views of FIG. 3, taken along line A-A and line B-B.
Figure 4B:
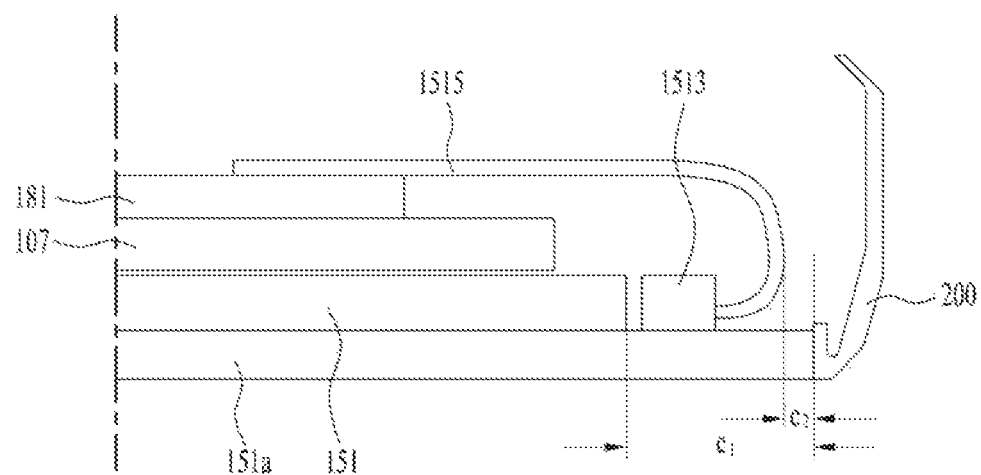

FIGS. 4A and 4B are cross-sectional views of FIG. 3, taken along line A-A and line B-B. With reference to FIG. 4A, if the distance a of a space between the base unit 107 and the side unit 200 is 1 mm or more, antenna performance of a reference value or more may be acquired. If the distance a of the space between the base unit 107 and the side unit 200 is excessively increased, the size of parts of the bezel located at the left and right of the mobile terminal 100 is increased and, thus, the distance a may be 3 mm or less.

A distance c1 between the display unit 151 and the side unit 200 at the lower end of the mobile terminal 100 is a distance between the first conductive member 211 or the second conductive member 212 and the display unit 151. That is, the distance c1 influences antenna performance and may thus be 1.5-2 mm or more.

Since the third conductive member 213 does not contact other conductive members and must be independent from the other conductive members (metal floating), the third conductive member 213 is spaced apart from the flexible display substrate 1515. However, the third conductive member 213 is not used as a radiator and, thus, a distance c2 between the flexible display substrate 1515 and the side unit 200, i.e., the third conductive member 213, at the lower end of the mobile terminal 100 may be about 0.3 mm.

A distance between the side unit 3 and the flexible display substrate 9 of the conventional mobile terminal 100 must be 2 mm or more, but, in this embodiment, the distance c2 of 0.3 mm between the flexible display substrate 1515 and the side unit 200 is sufficient and the size of the bezel at the lower end of the mobile terminal 100 may be reduced.

If the flexible display substrate 1515 overlaps the slits 221 and 222, antenna performance may be degraded. The conventional mobile terminal 100 uses a portion of the side unit 3 located at the lower end of the mobile terminal 100 as an antenna and, thus, the slit 4 overlaps the flexible display substrate 9 and reduction in reduction of the size of the bezel located at the lower portion of the display unit for securing wireless communication performance is limited.

However, in this embodiment, the side surfaces of the mobile terminal 100 may be used as antennas and, thus, the first conductive member 211 and the second conductive member 212 may be arranged so as not to overlap the flexible display substrate 1515. That is, the flexible display substrate 1515 does not overlap the slits 211 and 212 and, thus, radiation at the slits 221 and 222 may be effectively achieved.

However, if a user grips the mobile terminal 100 with a hand, the user's hand may contact a corner of the lower end of the mobile terminal 100. Therefore, the slits 211 and 212 may be spaced inwardly apart from the left and right corners of the lower end of the mobile terminal 100 by a designated distance d or more. Such a distance d may be varied according to the overall size of the mobile terminal 100 and, only if the distance d is 12 mm to 17 mm, antenna performance degradation due to a hand may be prevented. Although lengths of a first part 211a of the first conductive member 211 and a third part 212a of the second conductive member 212 may be different, a symmetrical structure is preferred in terms of design and, thus, in this embodiment, the first part 211a and the third part 212a having the same length d will be described.

The length of an antenna influences a wavelength of a transmitted or received signal (a resonant frequency signal) and a slot-type antenna in accordance with the present invention may have a length of ¼ of a resonant frequency (λ/4). Since the length of the antenna is directly proportional to the wavelength of the resonant frequency, the length of the first antenna Ant.1 may be longer than the length of the second antenna Ant.2 such that the first antenna Ant.1 transmits and receives a first signal of a low frequency (700-950 MHz) and the second antenna Ant.2 transmits and receives a second signal of a medium frequency (1,650 MHz-2.3 GHz).

The first conductive member 211 may include the first part 211a located on the first side surface and a second part 211b located on the second side surface and be arranged in an L-shape at a corner of the mobile terminal 100. The end of the second part 211b is connected to the base unit 107 and the end of the first part 211a maintains a state spaced apart from the base unit 107 and, thus, the first part 211a and the second part 211b form a slot antenna.

In order to arrange the first part 211a so as not to overlap the flexible display substrate 151, the length of the first part 211a is limited and, thus, the length $b_1$ of the second part 211b may be longer than the length of the first part 211a d ($d<b_1$). If a slot extends to an excessively higher position, antenna performance may be degraded due to a user's hand and, thus, the length $b_1$ of the second part 211b may be about 50 mm.

The second antenna Ant.2 formed by the second conductive member 212 transmits and receives a medium frequency signal and has a shorter length than the first conductive member 211. Therefore, a length b2 of a fourth part 212b of the second conductive member 212, located on the third side surface, is shorter than the length $b_1$ of the second part 211b of the first conductive member 211. A ratio of the wavelength of the first signal to the wavelength of the second signal is directly proportional to a ratio of the length $d+b_1$ of the first conductive member 211 to the length d+b2 of the second conductive member 212. In more detail, the ratio of the wavelength of the first signal to the wavelength of the second signal is directly proportional to a ratio of the sum of the length $d+b_1$ of the first conductive member 211 and a length of a ground line 235 connected thereto to the sum of the length d+b2 of the second conductive member 212 and a length of a ground line 235 connected thereto.

For example, if the ratio of the wavelength of the first signal to the wavelength of the second signal is about 2:1, the length of the second part 211b is 50 mm and the lengths of the first part 211a and the third part 212a are 15 mm, the length of the fourth part 212b may be 17 mm.

Figure 5:
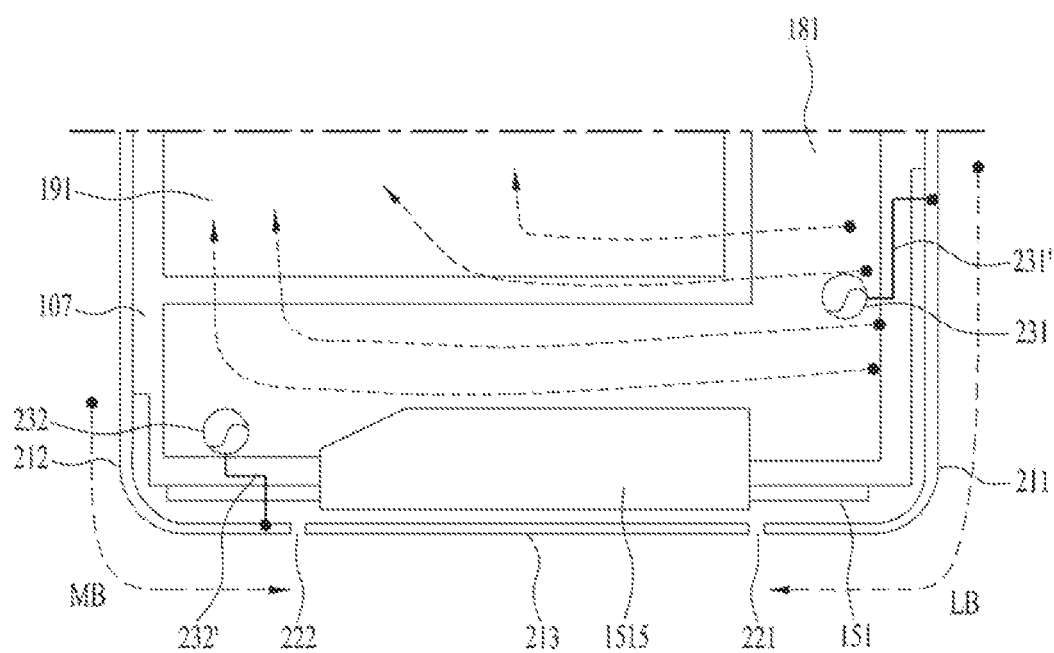
FIG. 5 is a view illustrating feed units of first and second antennas and current flow in the mobile terminal in accordance with one embodiment of the present invention.

FIG. 5 is a view illustrating feed units 231 and 232 of the first and second antennas Ant.1 and Ant.2 and current flow in the mobile terminal 100 in accordance with one embodiment of the present invention. The positions of the feed units 231 and 232 may be arranged in consideration of frequency characteristics, positions of peripheral devices, etc.

As exemplarily shown in FIG. 2, when power is applied to the conductive member located at the lower end of the conventional mobile terminal 100, current flows only in the vertical direction on the base unit 5. The first antenna Ant.1 of the mobile terminal 100 in accordance with the present invention is located at the side of the mobile terminal 100 and, thus, a feed line 231' supplying power from the feed unit 231 to the first antenna Ant.1 may be connected to the second part 211b of the first conductive member 211. As exemplarily shown in FIG. 5, when the feed line 231' is connected to the second part 211b of the side surface of the mobile terminal 100, current flows both in the horizontal direction and the vertical direction, as shown in arrows in FIG. 5.

Further, in order to provide a space to receive the battery 191, a central part of the main substrate 181 in accordance with the present invention may be arranged to avoid the position of the battery 191 and thus be adjacent to the first conductive member 211. That is, the main substrate 181 may have a C-shape, and various parts, such as the interface unit 160, the second audio output module 152b, the microphone 122, etc., are mounted on the lower end of the main substrate 181 and, thus, a radio frequency IC (RFIC), i.e., the first feed unit 231, may be arranged at the central part of the main substrate 181 adjacent to the side part of the battery 191. When the feed line 231' is connected to the side surface of the mobile terminal 100, a distance between the RFIC and the connecting position of the feed line 231' to the first conductive member 211 is not long and, thus, the length of the feed line 231' may be freely adjusted. That is, tuning of the antenna of a low frequency band is easy and, thus, a low frequency bandwidth may be improved.

The second feed unit 232 may be separately provided to supply power to the second conductive member 212, and a feed line 232' connected to the first feed unit 231 or the second feed unit 232 may directly contact the first conductive member 211 and thus supply power to the first conductive member 211, or supply power to the first conductive member 211 through a coupling method without direct contact with the first conductive member 211.

Figure 6A:
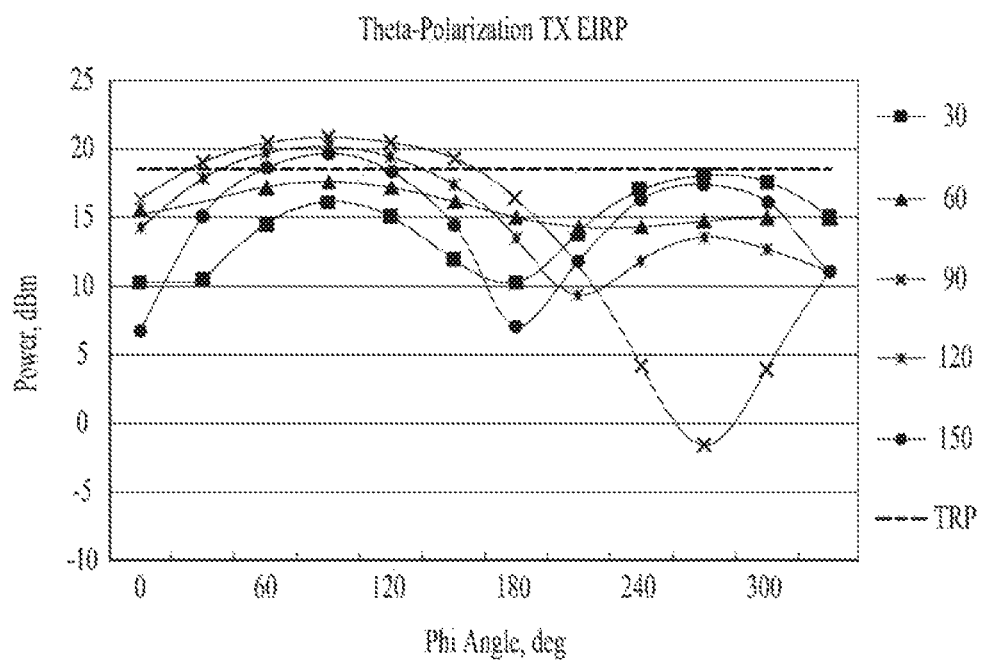
FIGS. 6A and 6B are graphs representing polarizations of electromagnetic waves formed by the antennas of the conventional mobile terminal.
Figure 6B:
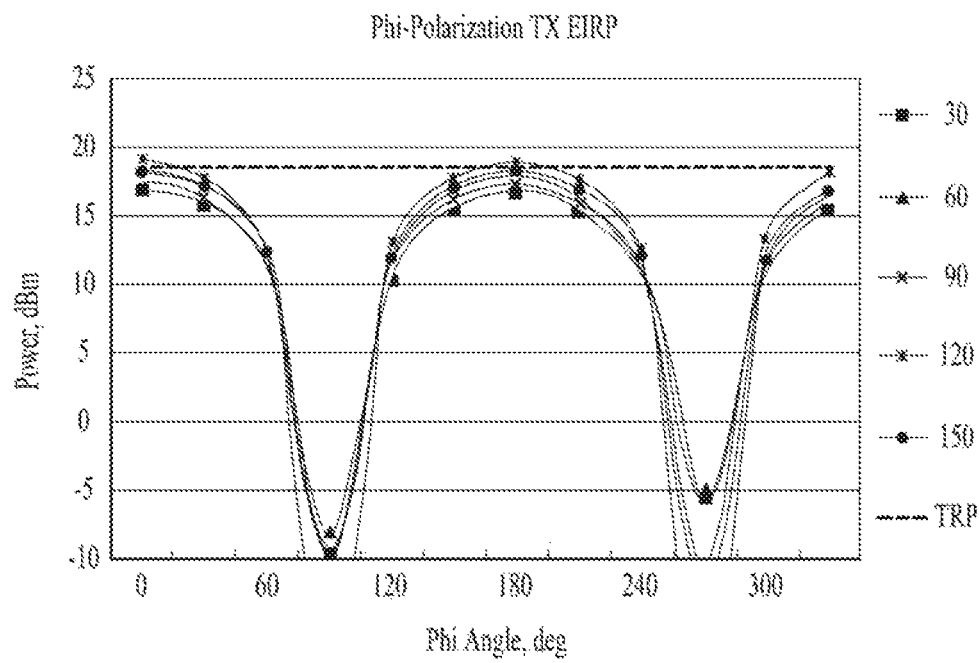
Figure 7A:
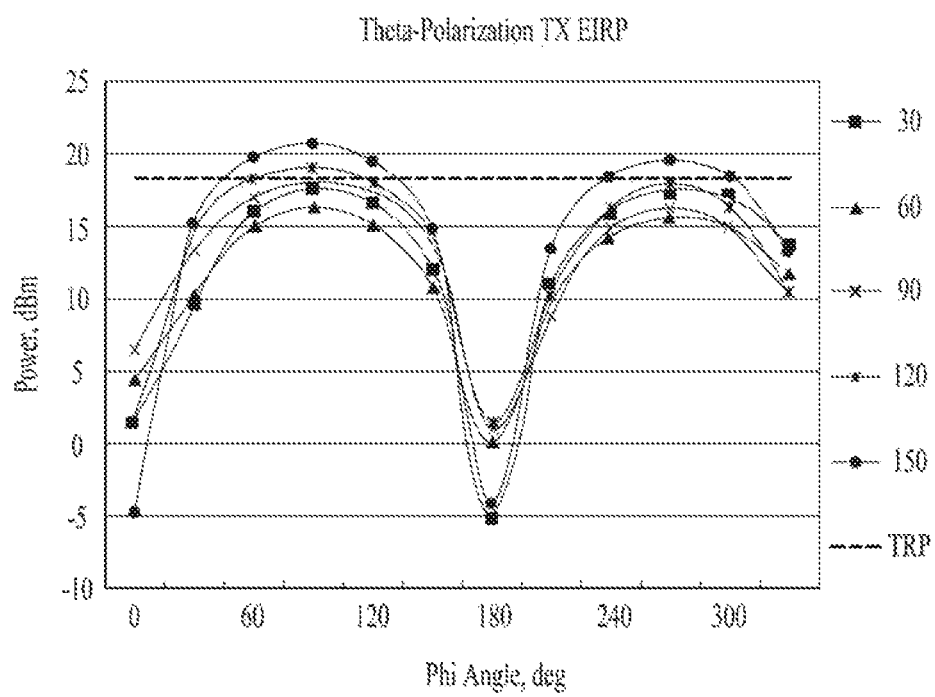
FIGS. 7A and 7B are graphs representing polarizations of electromagnetic waves formed by the antennas of the mobile terminal in accordance with the embodiment of the present invention.
Figure 7B:
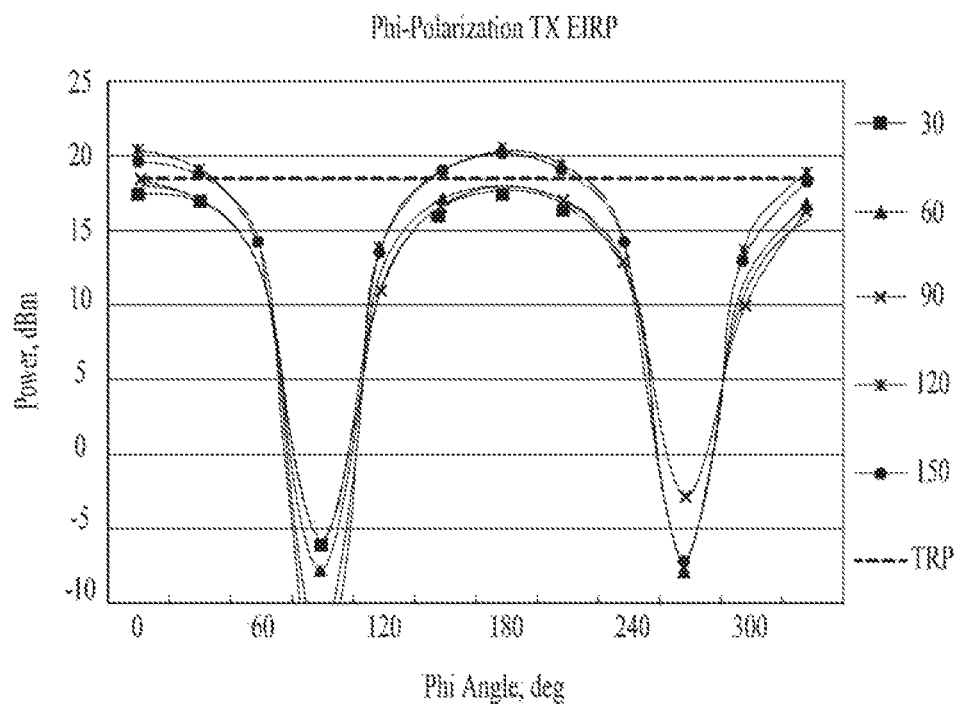

FIGS. 6A and 6B are graphs representing polarizations of electromagnetic waves formed by the antennas of the conventional mobile terminal 100, and FIGS. 7A and 7B are graphs representing polarizations of electromagnetic waves formed by the antennas of the mobile terminal 100 of FIG. 5.

The graphs of FIGS. 6A and 6B and FIGS. 7A and 7B represent powers of Theta and Phi polarizations in a spherical coordinate system. If power is supplied to the lower portion of the mobile terminal 100, Theta polarization maximum points are not uniform and, if power is supplied to the side surface of the mobile terminal 100, Theta polarization values form a uniform pattern (with reference to FIGS. 6A and 7A).

Further, it may be understood that Phi polarization values if power is supplied to the lower portion of the mobile terminal 100 are lower than Phi polarization values if power is supplied to the side surface of the mobile terminal (with reference to FIGS. 6B and 7B).

If power is supplied to the side surface of the mobile terminal 100, Theta polarization and Phi polarization have power of the same level, uniform radiation is carried out in any direction and, thus, wireless communication performance may be secured regardless of the inclination direction of the mobile terminal 100.

Figure 8:
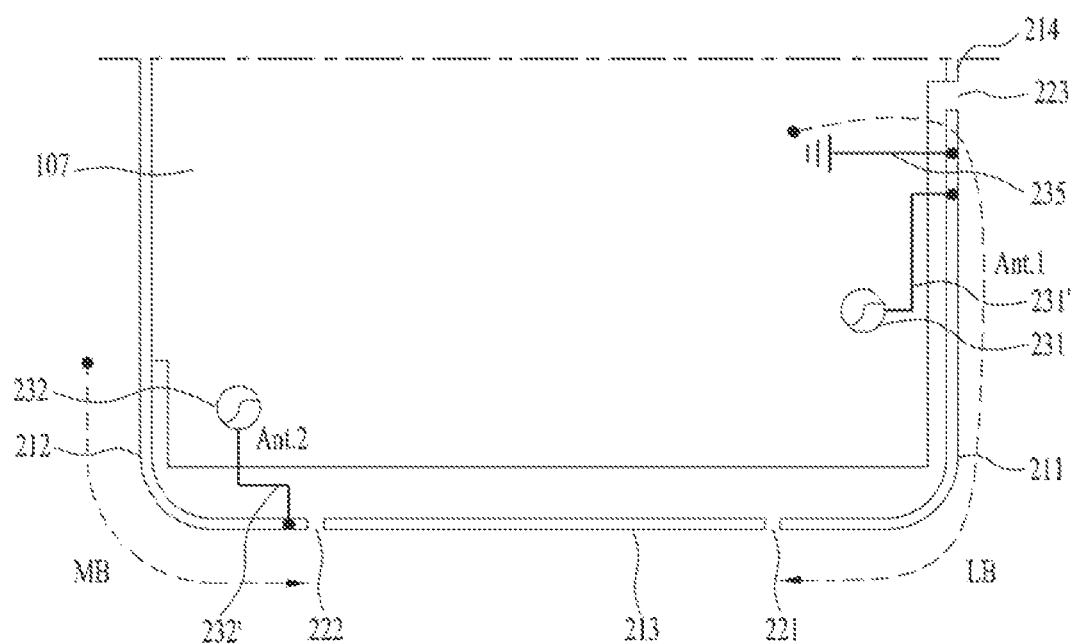
FIG. 8 is a view illustrating a mobile terminal including a third slit in accordance with another embodiment of the present invention.

FIG. 8 is a view illustrating a mobile terminal 100 including a third slit 223 in accordance with another embodiment of the present invention, and the third slit 223 is further formed on a side unit 200 of the mobile terminal 100 of FIG. 8 in a side direction, differently from the side unit 200 shown in FIG. 5. That is, a first conductive member 211 and a fourth conductive member 214 are divided from each other by the third slit 223, the fourth conductive member 214 is connected to a base unit 107, and a ground line 235, which is arranged adjacent to the third slit 223 and connects the first conductive member 211 to a ground so as to ground the first conductive member 211, is connected to the first conductive member 211. The ground line 235 may be directly connected to the base unit 107 or connected to the base unit 107 through a main substrate.

Since the base unit 107 serves as a ground plane in the mobile terminal 100, the portion of the first conductive member 211 connected to the base unit 107 in the embodiment shown in FIG. 5 exhibits a grounding effect. However, in the embodiment in which the base unit 107 and the first conductive member 211 are integrated, the ground position of the first antenna Ant.1 is not adjustable and thus limits antenna design.

On the other hand, in accordance with this embodiment, the ground line 235 is formed using a conductive thin film formed on the substrate and, thus, the shape, arrangement and length of the ground line 235 may be freely adjusted.

Figure 9A:
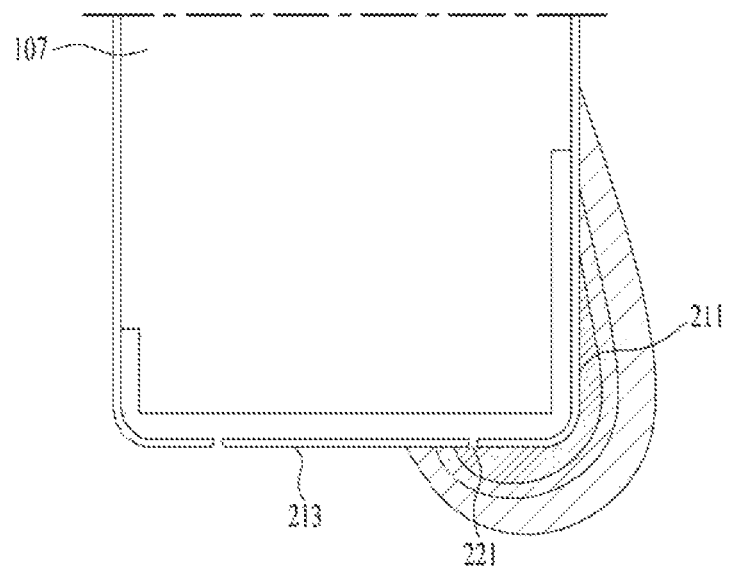
FIGS. 9A and 9B are views illustrating electromagnetic fields formed by the antennas in accordance with the embodiment of FIG. 5 and the embodiment of FIG. 8.
Figure 9B:
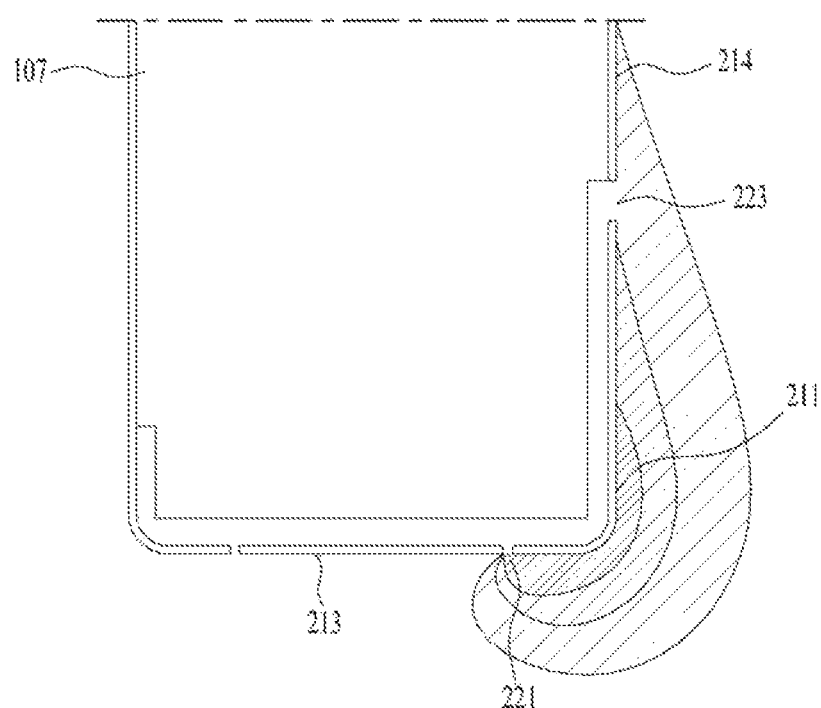

FIGS. 9A and 9B are views illustrating electromagnetic fields formed by the antennas in accordance with the embodiment of FIG. 5 and the embodiment of FIG. 8. As compared to the embodiment shown in FIG. 9A in which no third slit 223 is formed on the side surface of the mobile terminal 100, in the embodiment shown in FIG. 9A in which the third slit 223 is formed on the side surface of the mobile terminal 100, an electromagnetic field may be more widely distributed. If the electromagnetic field is distributed, a hand effect in which, when a user grips the mobile terminal with a hand, communication performance is degraded may be prevented.

Figure 10:
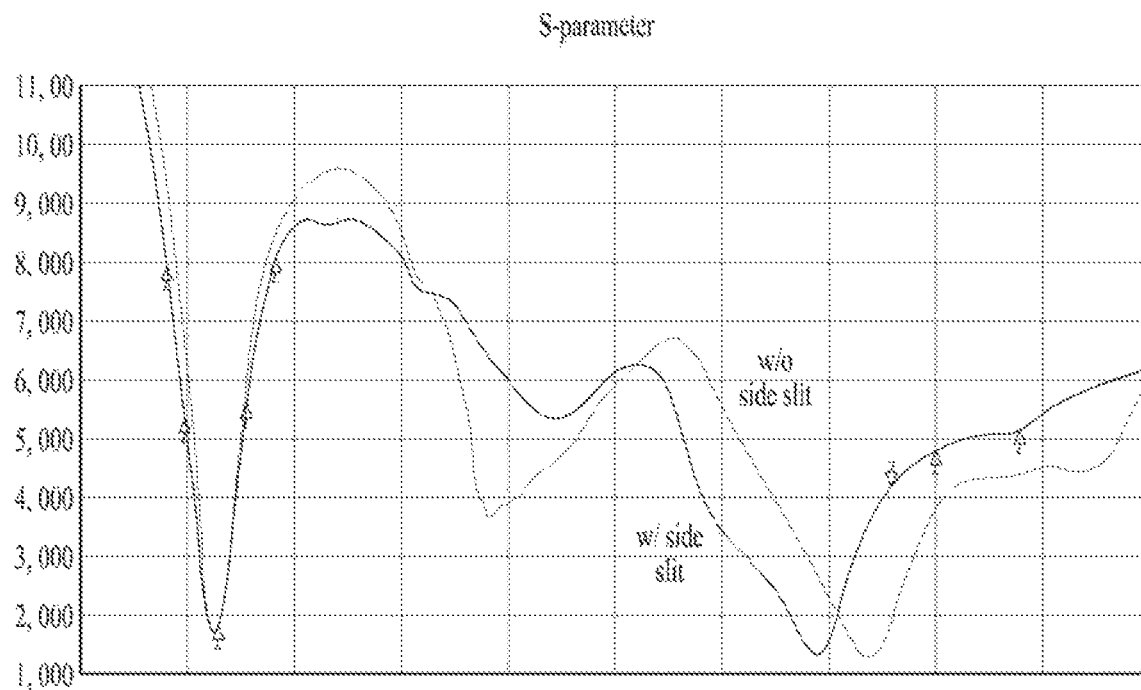
FIGS. 10A and 10B are views illustrating characteristics of the antennas in accordance with the embodiment of FIG. 5 and the embodiment of FIG. 8.
Figure 10:
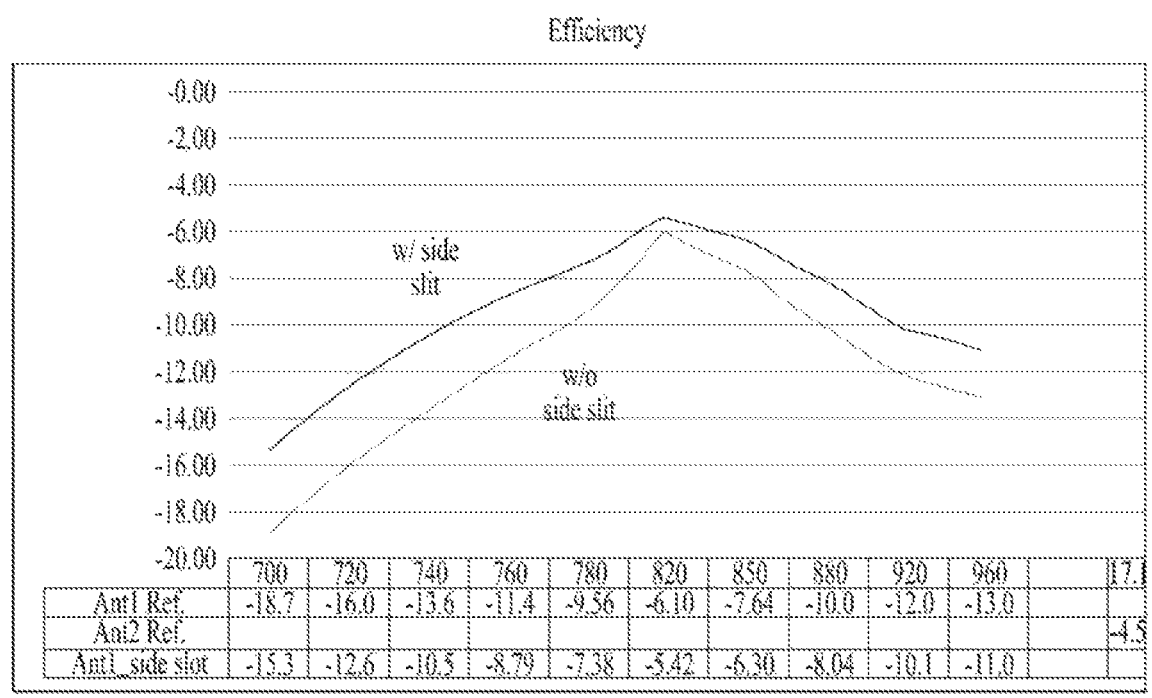

FIGS. 10A and 10B are views illustrating characteristics of the antennas in accordance with the embodiment of FIG. 5 and the embodiment of FIG. 8. In the embodiment in which the third slit 223 is formed (w/side slit), a low frequency bandwidth is broadened and efficiency is increased, as compared to the embodiment in which no third slit 223 is formed (w/o side slit).

Figure 11A:
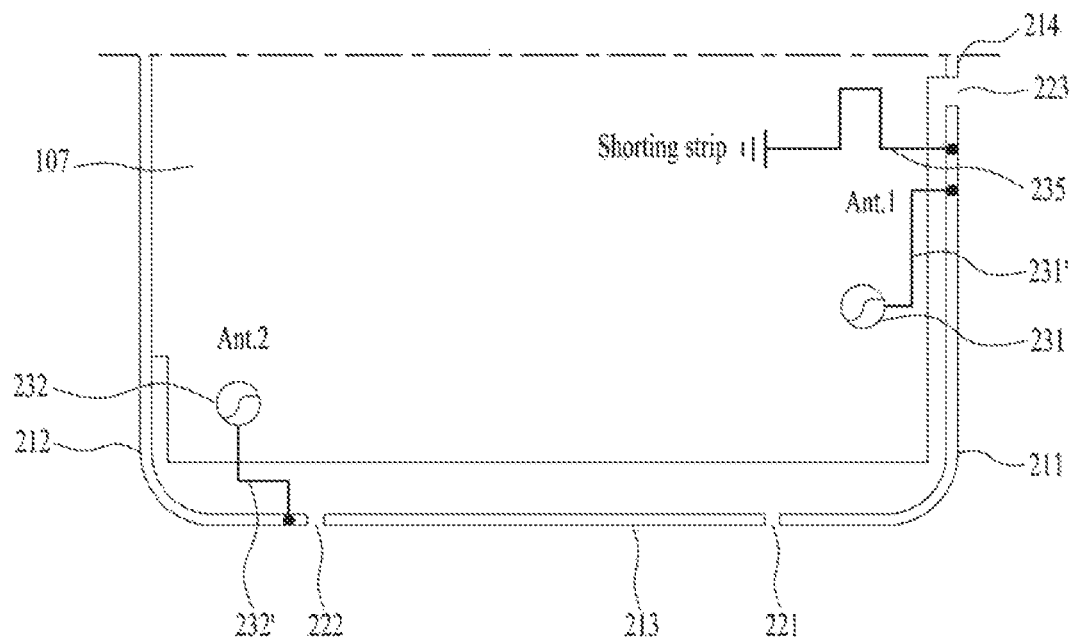
FIGS. 11A and 11B are a view illustrating a mobile terminal in accordance a modification of the embodiment of FIG. 8 and a graph illustrating antennas characteristics thereof.
Figure 11B:
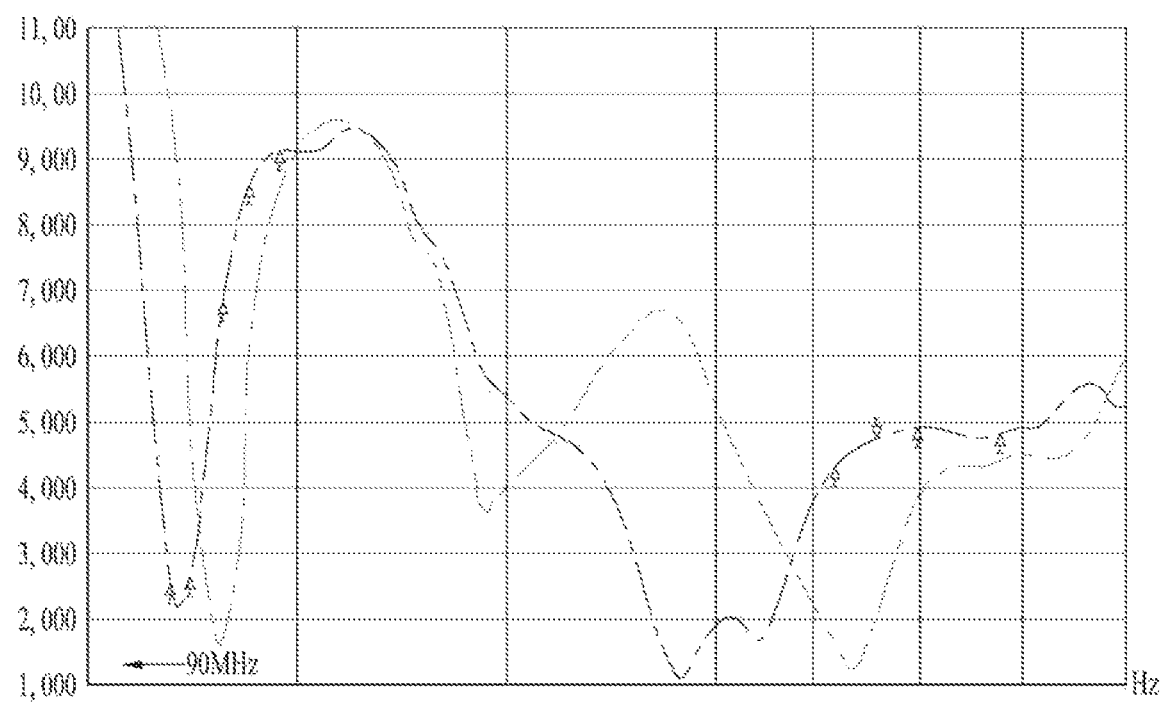

FIGS. 11A and 11B are a view illustrating a mobile terminal in accordance a modification of the embodiment of FIG. 8 and a graph illustrating antennas characteristics thereof. A resonant frequency may be tuned by adjusting the length of a ground line 235. The length of the ground line 235 may be adjusted so that the sum of the length of the ground line 235 and the length of a first conductive member 211 corresponds to ¼ of the frequency of a first signal ($\lambda_1/4$).

If a space in which the ground line 235 may be arranged is restrictive, the ground line 235 may be bent, as exemplarily shown in FIG. 11A. When the length of the ground line 235 is increased, a wavelength of a resonant frequency is increased and, thus, the resonant frequency is lowered, as exemplarily shown in FIG. 11B.

Figure 12A:
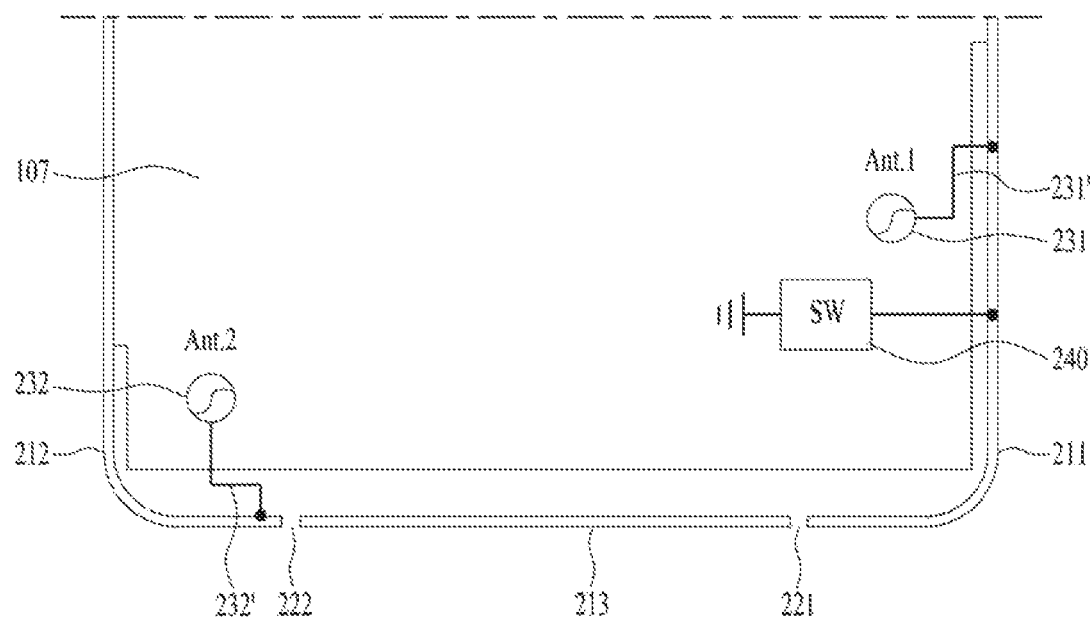
FIGS. 12A and 12B are views illustrating a mobile terminal in accordance with another embodiment of the present invention in which a switch is added to the mobile terminal in accordance with the embodiment of FIG. 5, and a mobile terminal in accordance with another embodiment of the present invention in which a switch is added to the mobile terminal in accordance with the embodiment of FIG. 8, respectively.
Figure 12B:
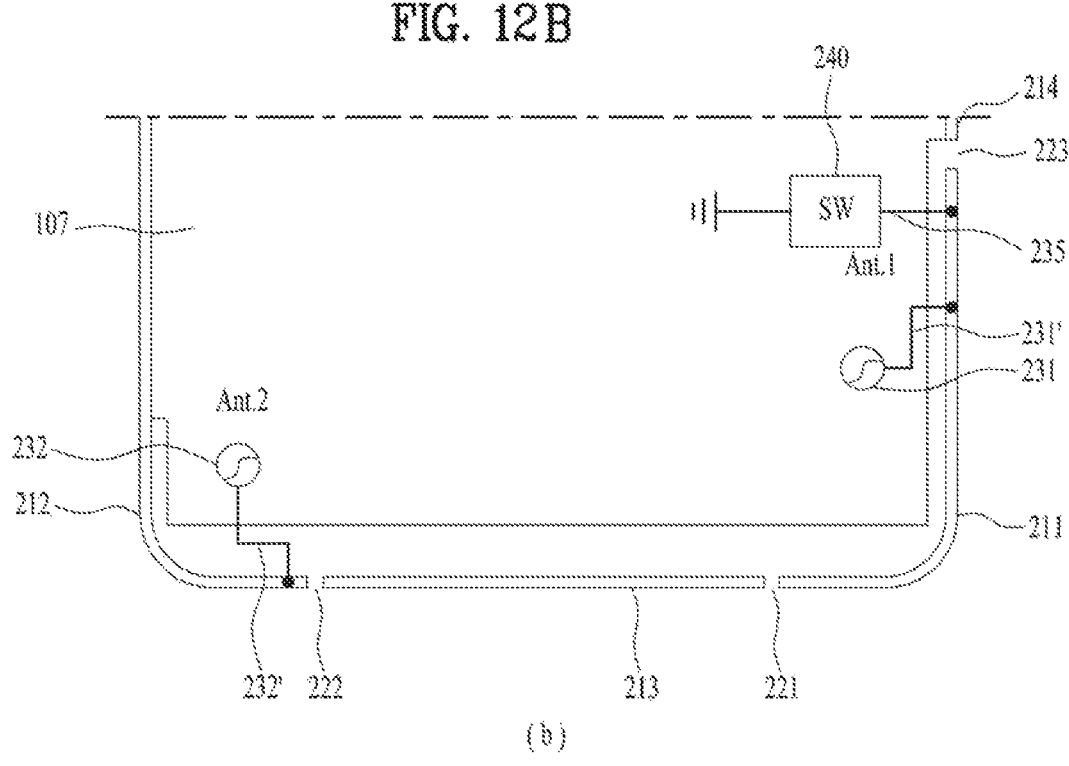
Figure 13A:
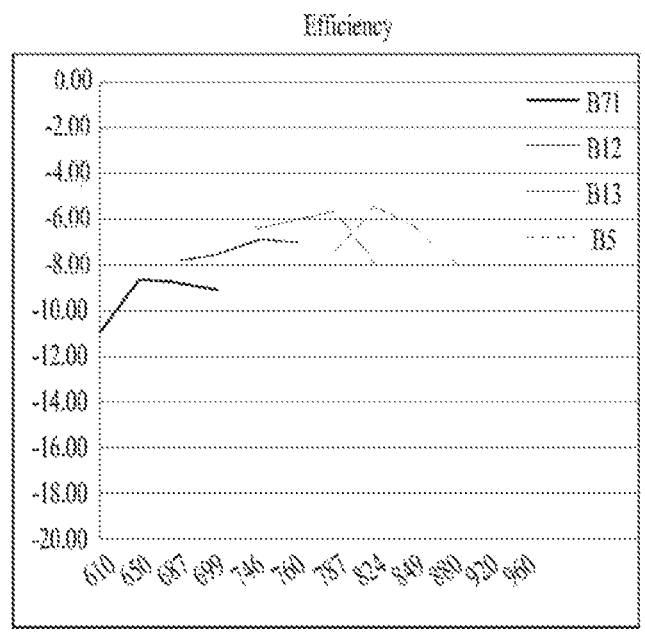
FIGS. 13A and 13B are graphs representing efficiencies of the antennas of FIGS. 12A and 12B according to switching.
Figure 13B:
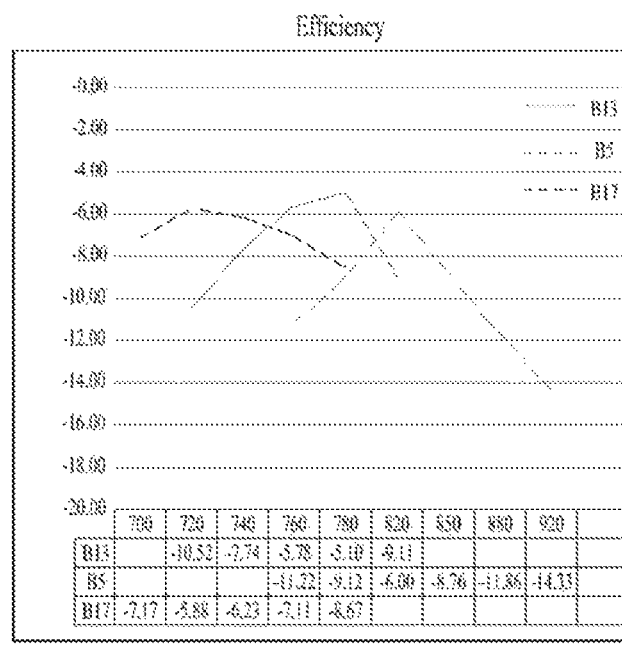

FIGS. 12A and 12B are views illustrating a mobile terminal in accordance with another embodiment of the present invention in which a switch 240 is added to the mobile terminal in accordance with the embodiment of FIG. 5, and a mobile terminal in accordance with another embodiment of the present invention in which a switch 240 is added to the mobile terminal in accordance with the embodiment of FIG. 8, respectively, and FIGS. 13A and 13B are graphs representing efficiencies of the antennas of FIGS. 12A and 12bB according to switching. Existence and nonexistence of the third slit 223 influences the position of the switch 240 to change the frequency of an antenna.

The switch 240 is connected to the antenna and thus selectively connects a circuit, thus changing a resonant frequency of the circuit. The switch 240 includes tuning elements formed on a main substrate 181 and may change the frequency within a designated range by selectively connecting the tuning elements. The tuning element includes an inductor, a capacitor or a resistor, and the end of the tuning element is connected to the ground.

Since countries or communication service providers use signals of slightly different frequency bands, the switch 240 is used to change a resonant frequency band within a range of dozens of MHz so that one mobile terminal may use communication services of different regions or different communication service providers.

The switch 240 adjusts a resonant frequency by changing current flow of the antenna and must be located at an end of the antenna so as to easily change the resonant frequency. However, if the switch 240 is located at an open end of the antenna (i.e., an end of a first part 211a adjacent to a first slit 221), the open end of the antenna is grounded. Therefore, the switch 240 may be arranged adjacent to a closed end of the antenna (i.e., an end of a second part 211b connected to the base unit 107).

As exemplarily shown in FIG. 12A, a portion of the second part 211b of the side surface of the mobile terminal 100 connected to the base unit 107 without the third slit 223 have the same effect as an antenna grounding effect. Even if the switch 240 is connected to a position of the second part 211b adjacent to the portion of the second part 211b connected to the base unit 107, current flows to a portion of the second part 211b connected to the base unit 107 and effects of switching are insignificant.

Therefore, in this case, the switch 240 is arranged at a position closer to the open end of the first part 211a than the feed line 231' and, if the switch 240 is adjacent to the feed line 231', effects of switching are lowered and, thus, the switch 240 is arranged so as to be spaced apart from the feed line 231' by a designated distance.

As exemplarily shown in FIG. 12B, if the third slit 223 is formed on the side surface of the mobile terminal 100, the first conductive member 211 is not directly connected to the base unit 108 and is grounded through the ground line 235. If the antenna is grounded using the ground line 235, the antenna may be easily tuned and the switch 240 may be arranged on the ground line 235. When the switch 240 is arranged on the ground line 235, a frequency is tuned by changing the ground line 235 and may thus be more easily changed, as compared to the embodiment shown in FIG. 12A.

FIG. 13A is a graph representing efficiency of the antennas of FIG. 12A, and FIG. 13B is a graph representing efficiency of the antennas of 12bB. In the graph of FIG. 13A, a resonant frequency is changed according to switching but there is an efficiency deviation between the changed resonant frequencies and thus frequency tuning effects are insignificant but, in the graph of FIG. 13B, there is little efficiency deviation according to change of a resonant frequency and thus an antenna efficiency balance according to switching is improved.

Figure 14:
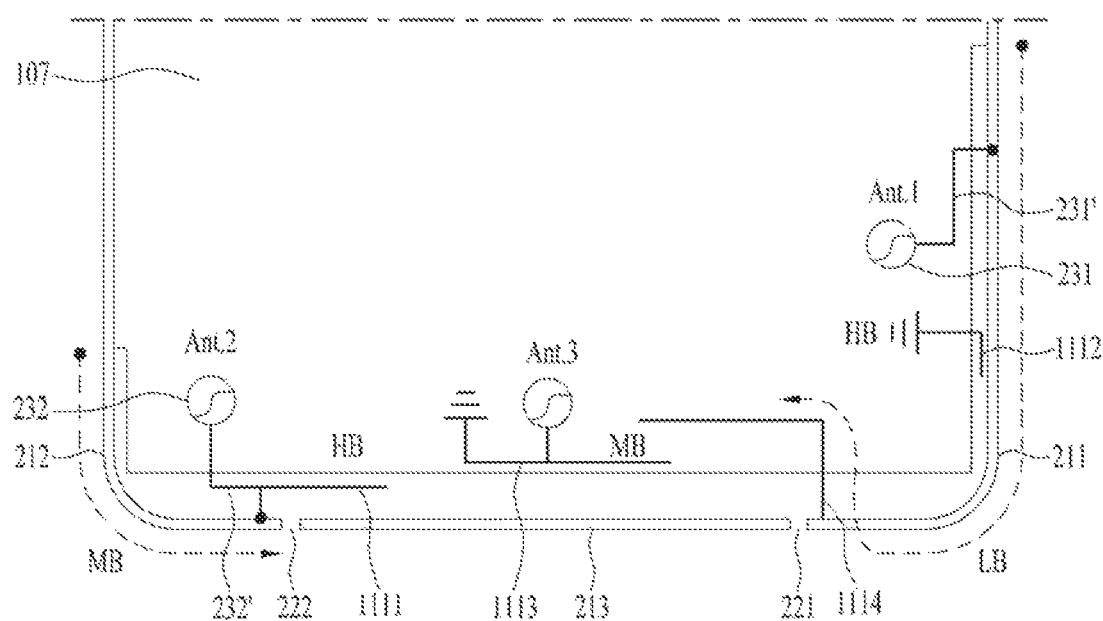
FIG. 14 is a view illustrating a mobile terminal in accordance with another embodiment of the present invention in which a third antenna is added to the mobile terminal in accordance with the embodiment of FIG. 5.

FIG. 14 is a view illustrating a mobile terminal in accordance with another embodiment of the present invention in which a third antenna Ant.3 is added to the mobile terminal in accordance with the embodiment of FIG. 5. Recently, in order to transmit and receive large amounts of data and to achieve stable communication, a mobile terminal includes a plurality of antennas to transmit and receive signals of a medium frequency band and a high frequency band. The first antenna Ant.1 transmits and receives a first signal of a low frequency band, and the second antenna Ant.2 having a shorter length than that of the first antenna Ant.1 is used as a main antenna to transmit and receive a second signal of a medium frequency band.

The mobile terminal may not use all signals of various frequency bands only through the two antennas and thus further include an additional antenna. An antenna to transmit and receive a signal of a high frequency band may be additionally implemented by connecting a conductive pattern 1111 to the feed line of the second antenna Ant.2. Even if the conductive pattern 1111 is arranged so as to overlap the third conductive member 213, the third conductive member 213 is not used as an antenna and does not influence radiation of the conductive pattern 1111.

Further, the third antenna Ant.3 operating independently may be implemented by forming a radiation pattern adjacent to the lower end of the mobile terminal 1000 and supplying power to the radiation pattern. The radiation pattern may be a conductive pattern formed on the main substrate 181 or a conductive pattern formed on the inner surface of the rear case 102. By grounding the conductive pattern and supplying power to the conductive pattern, the conductive pattern may be used as the third antenna Ant.3. The third antenna Ant.3 has a short length and may thus be used a sub-antenna to transmit and receive a signal of a high frequency band.

As exemplarily shown in FIG. 14, a stub 1114 is connected to the end of the first conductive member 211 and may thus adjust a resonant frequency. When the length of the stub 1114 is increased by 10 mm, the resonant frequency may be lowered by 80 MHz. The stub 1114 may be formed on the main substrate 181 or formed on the inner surface of the rear case 102. The length of the stub 1114 may be adjusted so that the sum of the length of the stub 1114 and the length of a first conductive member 211 corresponds to ¼ of the wavelength of a first signal (i.e., $\Delta_1/4$), thus tuning the first signal.

Figure 15:
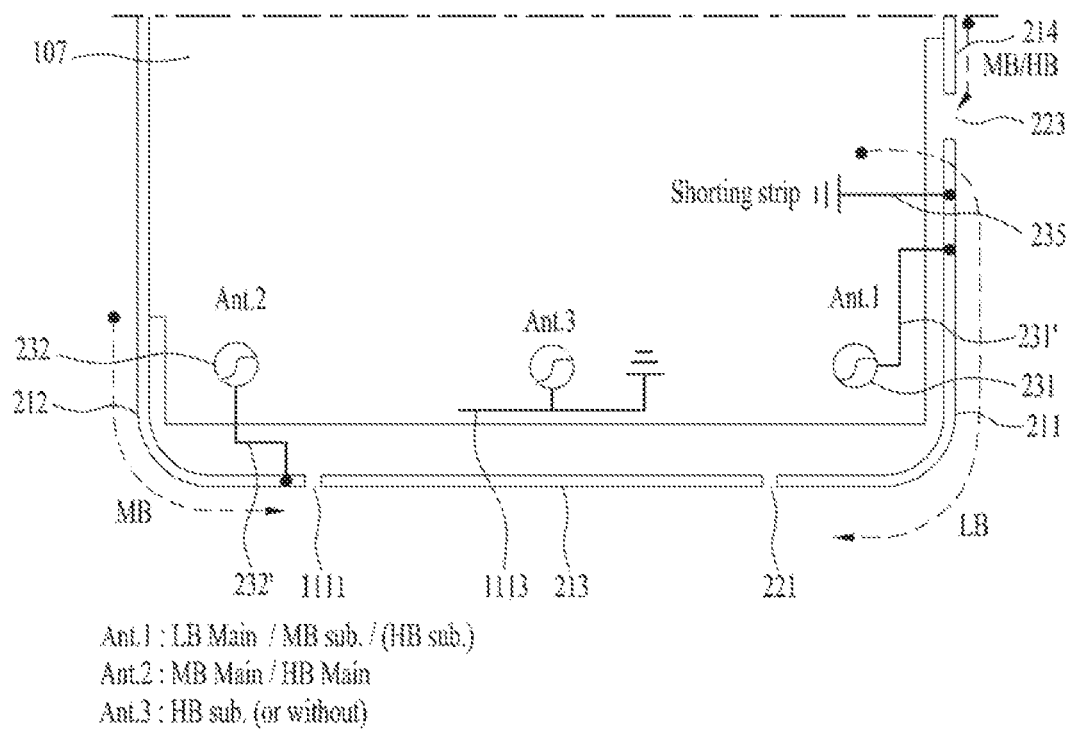
FIG. 15 is a view illustrating a mobile terminal in accordance with another embodiment of the present invention in which a third antenna is added to the mobile terminal in accordance with the embodiment of FIG. 8.
Figure 16:
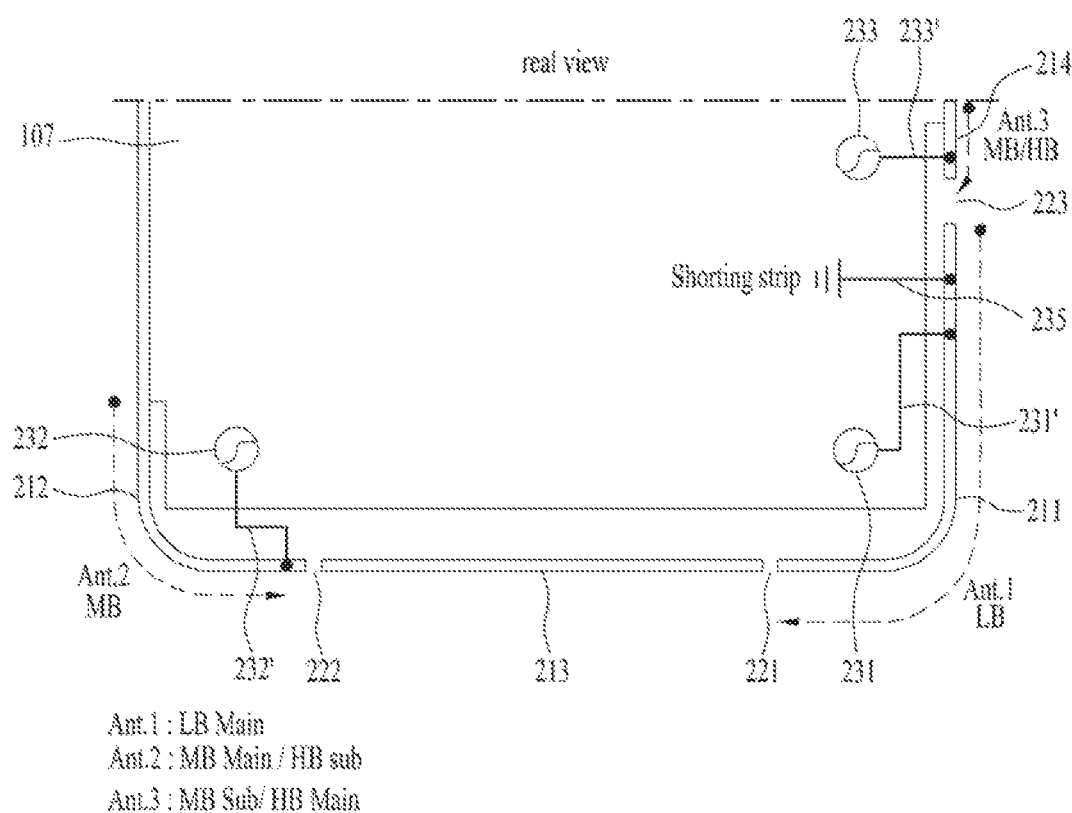
FIG. 16 is a view illustrating a mobile terminal in accordance with another embodiment of the present invention in which a third antenna is added to the mobile terminal in accordance with the embodiment of FIG. 8.

FIGS. 15 and 16 are views illustrating mobile terminals in accordance with other embodiments of the present invention in which a third antenna is added to the mobile terminal in accordance with the embodiment of FIG. 8. In these embodiments, a part of the fourth conductive member 214 of the side unit 200 divided from the first conductive member 211 by the third slit 223 is spaced apart from the base unit 107 and thus, a signal may be transmitted and received using a slot between the fourth conductive member 214 and the base unit 107.

Due to such a fourth conductive member 214, when power is supplied to the first antenna Ant.1, the first antenna Ant.1 may transmit and receive not only a signal of a low frequency band but also a signal of a medium or high frequency band. The first antenna Ant.1 may transmit and receive a signal of a medium frequency band if the length of the fourth conductive member 214 is long, and transmit and receive a signal of a high frequency band if the length of the fourth conductive member 214 is short.

That is, the first antenna Ant.1 may serve as a sub-antenna of a medium frequency band or a high frequency band. In this case, the first antenna Ant.1 may have the same function as the third antenna Ant.3 and thus the third antenna Ant.3 may be omitted.

As exemplarily shown in FIG. 16, a separate feed line 233' may be connected to the fourth conductive member 214 and thus the fourth conductive member 214 may be used as a third antenna Ant.3 to transmit and receive a third signal. Since the fourth conductive member 214 forms a slot-type antenna, a length from a portion of the fourth conductive member 214 connected to the base unit 107 to the third slit 223 may be ¼ or less of the frequency of the third signal ($\lambda_3/4$ or less).

If the fourth conductive member 214 is used as the third antenna Ant.3, the first antenna Ant.1 may serve as a main antenna of a signal of a low frequency band, the second antenna Ant.2 may serve as a main antenna of a signal of a medium frequency band, and the third antenna Ant.3 may serve as a main antenna of a signal of a high frequency band. As circumstances require, the second antenna Ant.2 may also serve as a sub-antenna of a high frequency band and the third antenna Ant.3 may also serve as a sub-antenna of a medium frequency band.

Figure 17A:
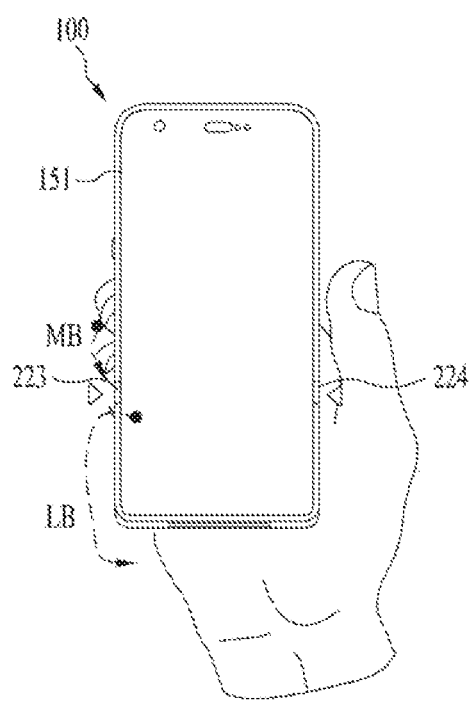
FIGS. 17A and 17B are views illustrating operation of an antenna according to a hand griping a mobile terminal.
Figure 17B:
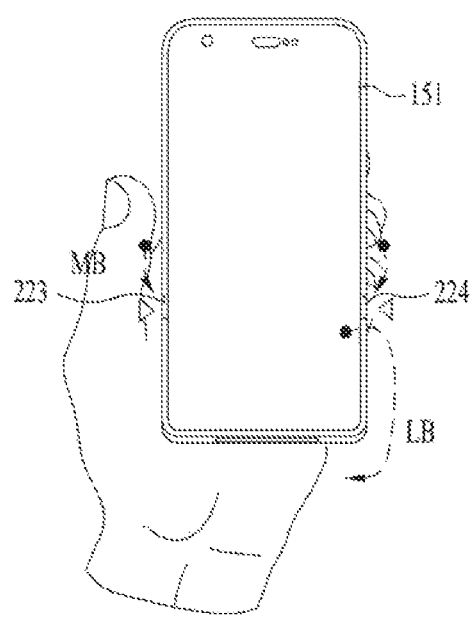
Figure 18:
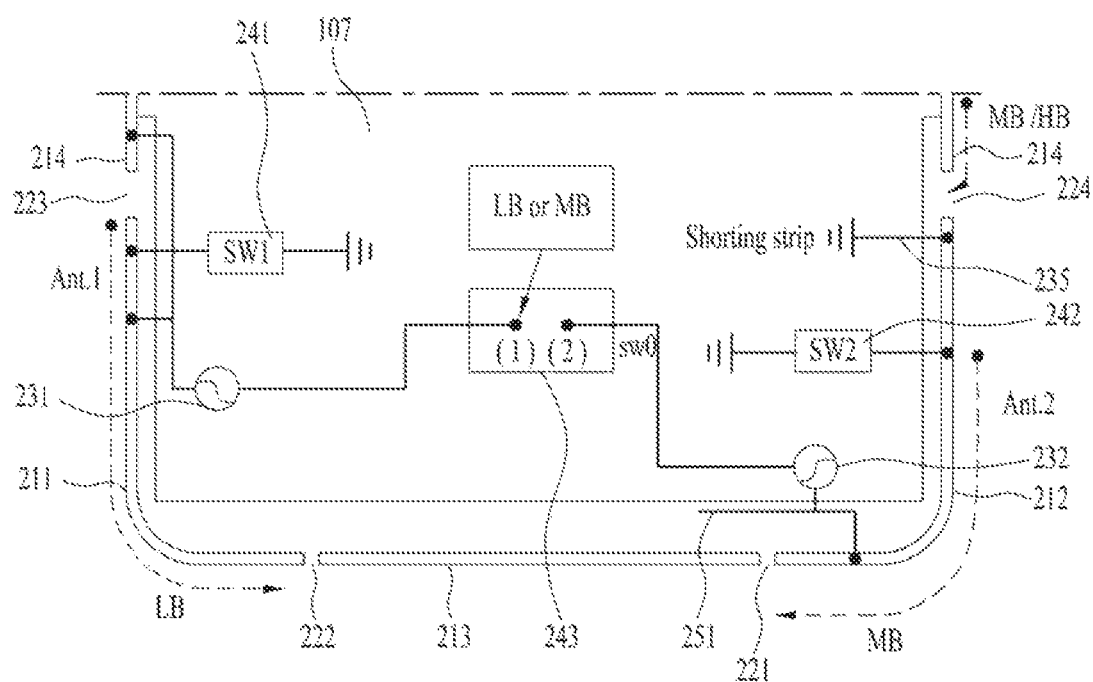
FIG. 18 is a view illustrating a mobile terminal in accordance with another embodiment of the present invention in which a first antenna and a second antenna are selectively usable.

FIGS. 17A and 17B are views illustrating operation of an antenna according to a hand griping the mobile terminal 100, and FIG. 18 is a view illustrating a mobile terminal in accordance with another embodiment of the present invention in which a first antenna Ant.1 and a second antenna Ant.2 are selectively usable.

When a user grips the mobile terminal 100 with a hand, the user's hand contacts the side unit 200. When the user's hand contacts the side unit 200, current flows, antenna performance is degraded (the hand effect) and thus a resonant frequency is distorted and performance of the mobile terminal is degraded. When a user grips the mobile terminal 100 with a hand, as exemplarily shown in FIGS. 17A and 17B, a region of the palm adjacent to the thumb contacts the side unit 200, and, thus, if the user grips the mobile terminal 100 with a left hand, performance of the first antenna Ant.1 located at the left side of the mobile terminal 100 is degraded and, if the user grips the mobile terminal 100 with a right hand, performance of the second antenna Ant.2 located at the right side of the mobile terminal 100 is degraded.

In this embodiment, if performance of one of the first antenna Ant.1 and the second antenna Ant.2 is influenced by a user's hand, a feed unit is controlled such that the other antenna which is normally operated transmits a first signal (a low frequency signal) and, thus, wireless communication performance may be maintained. FIG. 18 illustrates a base unit 107 and a side unit 200, as viewed from the front surface of a mobile terminal 100, a first antenna Ant.1 is located at the left side of the mobile terminal 100, and a second antenna Ant.2 is located at the right side of the mobile terminal 100. In order not only to transmit and receive a second signal but also to transmit and receive a first signal in some cases, a fourth part 212b of the second antenna Ant.2 may extend so that the second antenna Ant.2 may have a length corresponding to the length of the first antenna Ant.1. The fourth part 212b may be directly connected to the base unit 107, or be divided by a fourth slit and thus be grounded by a ground line 235 without direct connection to the base unit 107, as exemplarily shown in FIG. 18.

The first antenna Ant.1 may include a first switch 241 located on the ground line 235. The first switch 241 is connected to a tuning circuit to minutely tune the first signal, as described above, and, if performance of the first antenna Ant.1 is degraded, the first switch 241 may be opened and thus control the first conductive member 211 so as not to function as the antenna.

The second antenna Ant.2 may include a second switch 242 located at a position corresponding to the portion of the second conductive member 212 connected to the base unit 107 in the embodiment of FIG. 8, separately from the ground line 235. The second antenna Ant.2 includes the second switch 242 located at a position corresponding to the wavelength of the second signal so as to transmit and receive the second signal and, if the second signal is transmitted and received, the second switch 242 is closed and, thus, the length of the second antenna Ant.2 may be shortened.

A changeover switch 243 connected to a first feed unit 231 to supply power to the first antenna Ant.1 and a second feed unit 232 to supply power to the second antenna Ant.2 may reconstitute antenna arrangement according to user's gripping of the mobile terminal 100.

In a state in which a user does not grip the mobile terminal 100 with a hand, i.e., an ideally operating state (free state) of the mobile terminal 100, the first antenna Ant.1 may transmit and receive the first signal of a low frequency band, and the second antenna Ant.2 may transmit and receive the second signal of a medium frequency band. The first switch 241 may be connected to a proper tuning circuit to tune a frequency so as to correspond to the first signal of the low frequency band transmitted and received by the first antenna Ant.1. The second switch 242 is closed and short-circuited so as to cause the second antenna Ant.2 to transmit and receive the second signal, and, thus, the length of the second antenna Ant.2 may be reduced to correspond to ¼ of the wavelength of the second signal. A stub 1114 may be additionally connected to the second antenna Ant.2 and thus be used as an antenna to transmit and receive a third signal.

If a user grips the mobile terminal 100 with a right hand, as exemplarily shown in FIG. 17A (right hand), the user's right hand contacts the second conductive member 212 of the second antenna Ant.2 and may not serve as the antenna to transmit and receive the second signal. Therefore, the first antenna Ant.1 may be controlled so as to transmit and receive both the first signal and the second signal. The first conductive member 211 may transmit and receive the first signal, and the fourth conductive member 214 divided from the first conductive member 211 by the third slit 223 may transmit and receive the second signal.

If the user grips the mobile terminal 100 with a left hand, as exemplarily shown in FIG. 17B (left hand), the user's left hand contacts the first conductive member 211 of the first antenna Ant.1, performance of the first antenna Ant.1 is degraded and, thus, the changeover switch 243 may be controlled such that the second antenna Ant.2 transmits and receives the first signal. The first switch 241 is opened so that the first conductive member 211 does not function as an antenna, and the second switch 242 connected to the second conductive member 212 may be controlled so that the second conductive member 212 transmits and receives the first signal. Since the second conductive member 212 transmits and receives the first signal, the third conductive member 213 transmits and receives the second signal and may thus compensate for antenna performance degradation due to the user's hand.

Contact of the user's hand with the mobile terminal 100 may be sensed using a touch sensor and, if antenna performance at a specific signal is degraded, such a state is determined as a user's hand contact state and, thus, antenna arrangement may be reconstituted by an optimal combination through switching.

Figure 19:
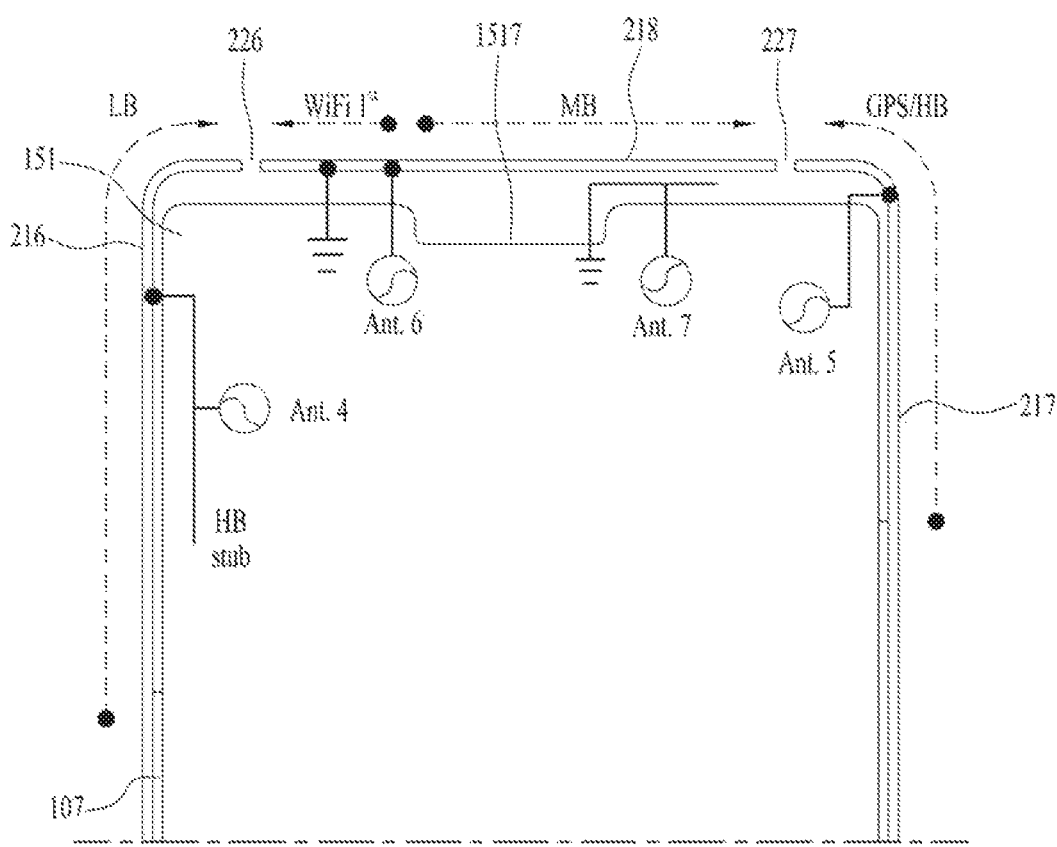
FIG. 19 is a view illustrating a mobile terminal in accordance with yet another embodiment of the present invention.

FIG. 19 is a view illustrating a mobile terminal in accordance with yet another embodiment of the present invention. Although the above-described embodiments illustrate the conductive member located at the lower portion of the mobile terminal 100, in order to secure a mounting space due to increase in the number of antennas, a conductive member located at the upper portion of the mobile terminal 100 may extend in leftward and rightward directions and thus the number of antennas located at the upper portion of the mobile terminal may be increased, as described in this embodiment.

A fifth conductive member may extend in the lateral direction so that a fourth antenna transmits and receives a first signal of a low frequency band, and the number of antennas may be increased by additionally providing a stub 1114 or a conductive pattern.

As exemplarily shown in FIG. 19, a notch part 1517 in which a camera, various sensors, a receiver, etc. are located may be formed by cutting off a part of a display unit 151. Since electronic parts are mounted in the notch part 1517, if ends of a conductive member overlap the notch part 1517, antenna performance may be influenced. Therefore, a fourth slit and a fifth slit which divide the fifth conductive member from a sixth conductive member and a seventh conductive member may be located at the outside of the notch part 1517.

A flexible touch sensor substrate to connect a touch sensor arranged on the front surface of the display unit 161 and a main substrate 181 may be located at the upper portion of the mobile terminal so as to avoid overlapping between the flexible touch sensor substrate and a flexible display substrate 1515. In this case, the flexible touch sensor substrate is arranged so as not to overlap the slits 226 and 227 and, thus, antenna performance may be improved.

As is apparent from the above description, in a mobile terminal 100 in accordance with the present invention, antennas using a side unit 200 are arranged on side surfaces of the mobile terminal 100 and, thus, antenna performance may be secure while reducing the size of a bezel at the upper and lower portions of the mobile terminal 100. Further, the antennas are arranged at both sides of the mobile terminal 100 so as to form a symmetrical structure and, thus, wireless communication performance degraded due to a user's hand may be enhanced.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A mobile terminal comprising: a window forming a front face of the mobile terminal; a display disposed in a rear surface of the window; a rear cover forming a rear face of the mobile terminal; a transceiver including one or more modules for wireless communication; a plurality of antennas disposed in the mobile terminal for the wireless-communication; a plurality of feed lines supplying power to the plurality of antennas; and a metal side unit forming an external appearance of side surfaces of the mobile terminal, and having a first side surface and a second side surface facing each other in a first direction and a third side surface and a fourth side surface facing each other in a second direction perpendicular to the first direction, wherein the metal side unit comprises: a first conductive member located on the first side surface and the third side surface; a second conductive member located on the first side surface and the fourth side surface; a third conductive member located on the first side surface; and a fourth conductive member located on the third side surface, wherein the metal side unit has: a first slit located between a first end of the first conductive member and a first end of the third conductive member at the first side surface; a second slit located between a first end of the second conductive member and a second end of the third conductive member at the first side surface; and a third slit located between a second end of the first conductive member and a first end of the fourth conductive member at the third side surface, wherein the plurality of antennas comprises: a first antenna comprising the first conductive member and a first feed line connected with the first conductive member at the third side surface, and for transmitting and receiving a first signal of a low frequency; a second antenna comprising the second conductive member and a second feed line connected with the second conductive member at the first side surface, and for transmitting and receiving a second signal of a medium frequency; and a third antenna comprising the fourth conductive member and a third feed line connected with the fourth conductive member at the third side surface and for receiving a third signal of the medium frequency, and wherein the second antenna and the third antenna operate simultaneously in a multiple input multiple output (MIMO) scheme.

2. The mobile terminal of claim 1, wherein a length of the first conductive member located at the first side surface is shorter than a length of the first conductive member located at the third side surface.

3. The mobile terminal of claim 1, wherein the second antenna is a main antenna for the medium frequency and the third antenna is a sub antenna for the medium frequency.

4. The mobile terminal of claim 1, wherein the metal side unit further comprises:
a fifth conductive member located on the second side surface;
a sixth conductive member located on the second side surface and the fourth side surface; and a seventh conductive member located on the second side surface and the third side surface, and wherein the metal side unit further has:
- a fourth slit located between a first end of the fifth conductive member and a first end of the seventh conductive member at the second side surface; and
- a fifth slit located between a second end of the fifth conductive member and a first end of the sixth conductive member at the second side surface.

5. The mobile terminal of claim 4,
wherein the plurality of antennas further comprises a fourth antenna comprising the sixth conductive member and a fourth feed line connected with the sixth conductive member at the fourth side surface and for receiving a fourth signal of a high frequency.

6. The mobile terminal of claim 1, further comprising a metal base unit placed at an inner space formed by the window, the rear cover and the metal side unit,
wherein the second conductive member is connected to the metal base unit at the fourth side surface.

7. The mobile terminal of claim 6, wherein the fourth conductive member is connected to the metal base unit at the third side surface.

8. The mobile terminal of claim 6, further comprising a main substrate and a flexible display substrate connected to the main substrate, the flexible display substrate extending from an end of the display and passing through a space between the metal base unit and the third conductive member, wherein the first conductive member and the second conductive member do not overlap the flexible display substrate.

9. The mobile terminal of claim 1, further comprising a ground line connected to the first conductive member adjacent to the third slit.

10. The mobile terminal according to claim 1, further comprising:
- a changeover switch configured to selectively supply power to the first conductive member and the second conductive member.

11. A mobile terminal comprising: a window forming a front face of the mobile terminal; a display disposed in a rear surface of the window; a rear cover forming a rear face of the mobile terminal; a transceiver including one or more modules for wireless communication; a plurality of antennas for the wireless communication; a plurality of feed lines supplying power to the plurality of antennas; and a metal side unit forming an external appearance of side surfaces of the mobile terminal, and having a first side surface and a second side surface facing each other in a first direction and a third side surface and a fourth side surface facing each other in a second direction perpendicular to the first direction, wherein the metal side unit comprises: a first conductive member located on the first side surface and the third side surface; a second conductive member located on the first side surface and the fourth side surface; a third conductive member located on the first side surface; and a fourth conductive member located on the third side surface, wherein the metal side unit has: a first slit located between a first end of the first conductive member and a first end of the third conductive member at the first side surface; a second slit located between a first end of the second conductive member and a second end of the third conductive member at the first side surface; and a third slit located between a second end of the first conductive member and a first end of the fourth conductive member at the third side surface, wherein the plurality of antennas comprises: a first antenna comprising the first conductive member and a first feed line connected with the first conductive member at the third side surface, and for transmitting and receiving a first signal of a low frequency; a second antenna comprising the second conductive member and a second feed line connected with the second conductive member at the first side surface, and for transmitting and receiving a second signal of a high frequency; and a third antenna comprising the fourth conductive member and a third feed line connected with the fourth conductive member at the third side surface, and for receiving a third signal of the high frequency, and wherein the second antenna and the third antenna operate simultaneously in a multiple input multiple output (MIMO) scheme.

12. The mobile terminal of claim 11,
wherein a length of the first conductive member located at the first side surface is shorter than a length of the first conductive member located at the third side surface.

13. The mobile terminal of claim 11, wherein the second antenna is a sub antenna for the high frequency and the third antenna is a main antenna for the high frequency.

14. The mobile terminal of claim 11,
wherein the metal side unit further comprises:
- a fifth conductive member located on the second side surface;
- a sixth conductive member located on the second side surface and the fourth side surface; and
- a seventh conductive member located on the second side surface and the third side surface, and wherein the metal side unit further has:
- a fourth slit located between a first end of the fifth conductive member and a first end of the seventh conductive member at the second side surface; and
- a fifth slit located between a second end of the fifth conductive member and a first end of the sixth conductive member at the second side surface.

15. The mobile terminal of claim 14,
wherein the plurality of antennas further comprises a fourth antenna comprising the sixth conductive member and a fourth feed line connected with the sixth conductive member at the fourth side surface, and for receiving a fourth signal of the high frequency;
wherein the second antenna, the third antenna and the fourth antenna operate simultaneously in a MIMO scheme.

16. The mobile terminal of claim 15, wherein the third antenna is a main antenna for the high frequency and the fourth antenna is a sub antenna for the high frequency.

17. The mobile terminal of claim 1, further comprising a metal base unit placed at an inner space formed by the window, the rear cover and the metal side unit, and
wherein the second conductive member is connected to the metal base unit at the fourth side surface.

18. The mobile terminal of claim 17, wherein the fourth conductive member is connected to the metal base unit at the third side surface.

19. The mobile terminal of claim 17, further comprising a main substrate and a flexible display substrate connected to the main substrate, the flexible display substrate extending from an end of the display and passing through a space between the metal base unit and the third conductive member, wherein the first conductive member and the second conductive member do not overlap the flexible display substrate.

20. The mobile terminal of claim 11, further comprising a ground line connected to the first conductive member adjacent to the third slit.

* * * * *